US012058702B2

United States Patent
Abedini et al.

(10) Patent No.: US 12,058,702 B2
(45) Date of Patent: Aug. 6, 2024

(54) PER-CHILD RESOURCE CONFIGURATION ALLOCATION IN AN INTEGRATED ACCESS AND BACKHAUL (IAB) SYSTEM

(71) Applicant: QUALCOMM Incorporated, San Diego, CA (US)

(72) Inventors: Navid Abedini, Basking Ridge, NJ (US); Jianghong Luo, Skillman, NJ (US); Naeem Akl, Somerville, NJ (US); Luca Blessent, Whitehouse Station, NJ (US); Tao Luo, San Diego, CA (US); Karl Georg Hampel, Hoboken, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/451,637

(22) Filed: Oct. 20, 2021

(65) Prior Publication Data

US 2022/0124706 A1 Apr. 21, 2022

Related U.S. Application Data

(60) Provisional application No. 63/094,844, filed on Oct. 21, 2020.

(51) Int. Cl.
*H04W 72/27* (2023.01)
*H04W 72/0446* (2023.01)
*H04W 88/14* (2009.01)

(52) U.S. Cl.
CPC ....... *H04W 72/27* (2023.01); *H04W 72/0446* (2013.01); *H04W 88/14* (2013.01)

(58) Field of Classification Search
CPC .. H04W 72/27; H04W 72/0446; H04W 88/14
See application file for complete search history.

(56) References Cited

U.S. PATENT DOCUMENTS

| 2020/0252847 | A1* | 8/2020 | Park | H04W 36/08 |
| 2021/0144718 | A1* | 5/2021 | Jyothi | H04W 72/53 |
| 2022/0015093 | A1* | 1/2022 | Ying | H04B 7/15542 |

OTHER PUBLICATIONS

International Search Report and Written Opinion dated Feb. 28, 2022 from corresponding PCT Application No. PCT/US2021/071964.

(Continued)

*Primary Examiner* — Brian P Cox
(74) *Attorney, Agent, or Firm* — Arent Fox, LLP

(57) ABSTRACT

Aspects described herein relate to resource allocation in an integrated access and backhaul (IAB) system. A central unit (CU) transmits over a backhaul link a message to a distributed unit (DU) including a resource configuration for a DU cell and a child cell corresponding to a child node served by the DU cell. The DU determines that the message misidentifies the child cell using an ID of a different cell. In response to that determination, the DU communicates with the child node based on the resource configuration specific to the misidentified child cell. Using this coordinated technique enables the CU to provide the DU with a child-node specific resource configuration to enable the DU to use this configuration for communicating with the child node. This maximizes efficiency in multi-node communications between one or more child nodes and cells while adding minimal, if any, signaling overhead.

30 Claims, 11 Drawing Sheets

(56) References Cited

OTHER PUBLICATIONS

Intel Corporation: "Mechanisms for Resource Multiplexing among Backhaul and Access links", 3GPP Draft; R1-1906792, 3rd Generation Partnership Project (3GPP), Mobile Competence Centre ; 650, Route Des Lucioles ; F-06921 Sophia-Antipolis Cedex; France, vol. RAN WG1, No. Reno, USA; May 13, 2019-May 17, 2019 May 4, 2019 (May 4, 2019), XP051708828, Retrieved from the Internet: URL:http://www.3gpp.org/ftp/tsg%5Fran/WG1%5FRL1/TSGR1%5F97/Docs/R1%2D1906792%2Ezip [retrieved on May 4, 2019].
Qualcomm Incorporated: "(TP to NR_IAB BL CR to 38473) PHY layer parameter configuration", 3GPP Draft; R3-201355, 3rd Generation Partnership Project (3GPP), Mobile Competence Centre; 650, Route Des Lucioles; F-06921 Sophia-Antipolis Cedex; France vol. RAN WG3, No. Electronic Meeting; Feb. 24, 2020-Mar. 6, 2020 Mar. 8, 2020 (Mar. 8, 2020), XP051861675, Retrieved from the Internet: URL:https://ftp.3gpp.org/tsg_ran/WG3_lu/TSGR3_107_e/Docs/R3-201355.zip R3-201355 (TP NR_IAB Bl CR 38473) PHYlayer_param_config.docx [retrieved on Mar. 8, 2020].

\* cited by examiner

PER-CHILD RESOURCE CONFIGURATION ALLOCATION IN AN INTEGRATED ACCESS AND BACKHAUL (IAB) SYSTEM

CROSS REFERENCE TO RELATED APPLICATION(S)

This application claims the benefit of U.S. Provisional Application Ser. No. 63/094,844, entitled "PER-CHILD RESOURCE CONFIGURATION ALLOCATION IN AN INTEGRATED ACCESS AND BACKHAUL (IAB) SYSTEM" and filed on Oct. 21, 2020, the disclosure of which is expressly incorporated by reference herein in its entirety.

BACKGROUND

Aspects of the present disclosure relate generally to wireless communication systems, and more particularly, to resource allocation in an integrated access and backhaul (IAB) system.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, full duplex communication with respect to integrated access and backhaul (IAB) implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method, apparatus, and computer-readable medium of wireless communication at a distributed unit (DU) is disclosed. The apparatus may include a DU including a memory and at least one processor coupled to the memory. Via the at least one processor, the DU may receive, from a central unit (CU), a message including a resource configuration for a DU cell and a child cell corresponding to a child node served by the DU cell. The DU may determine that the message misidentifies the child cell using an ID of a different call. The DU may communicate with the child node based on a modified configuration specific to the child node.

According to another example, a method of wireless communications at a distributed unit (DU) is disclosed. The DU may receive, from a central unit (CU), a message comprising resource configurations for a DU cell and a child cell corresponding to a child node served by the DU cell. The DU may identify a field in the message specifying the child cell and an identifier thereof. The DU may determine the identifier of the child and DU cells in the message to be identical. The DU may then communicate with the child node based on the configuration of the child cell.

According to another example, a method of wireless communications at a distributed unit (DU) is disclosed. The DU may receive, from a central unit (CU), a message comprising resource configurations for a DU cell and a child cell corresponding to a child node served by the DU cell. The DU may determine an identifier of the child cell and another DU cell serving the child node to be identical. The DU may communicate with the child node based on the configuration of the child cell.

According to another example, a method of wireless communications at a distributed unit (DU) is disclosed. The DU may receive, from a central unit (CU), a message comprising a first resource configuration for a cell associated with the DU and serving a child node. The DU may identify in the message a second resource configuration for the DU cell. The DU may modify the first resource configuration based on the identified second configuration to enable the DU cell to communicate with the child node.

According to another example, a method of wireless communication at a central unit (CU) is disclosed. The CU may provide to a distribution unit (DU), using a first F1 application protocol (F1AP) message, a resource configuration including a cell-specific time-division duplex (TDD) configuration. The CU may provide to a child node of the DU, using a radio resource control (RRC) message, a dedicated time division duplex (TDD) configuration for communications between the DU and the child node. The CU may provide to the DU, using a second F1AP message, the dedicated TDD configuration. In response to identifying a conflict between the configurations, the CU may send an indication to the DU to override the cell-specific TDD-based configuration to enable an exchange of data between the DU and the child node pursuant to the RRC-based dedicated TDD configuration.

According to additional examples, an apparatus for performing the operations of each of the above-described methods is disclosed. The apparatus includes a transceiver, a memory configured to store instructions, and one more processors communicatively coupled with the transceiver and the memory, wherein the one or more processors are configured to execute the instructions to perform each of the operations of any of the above methods.

According to still additional examples, an apparatus for wireless communication is disclosed that includes means for performing the operations of the any of the above methods.

According to yet further examples, a non-transitory computer-readable medium includes code executable by one or more processors to perform each of the operations of any of the methods described above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
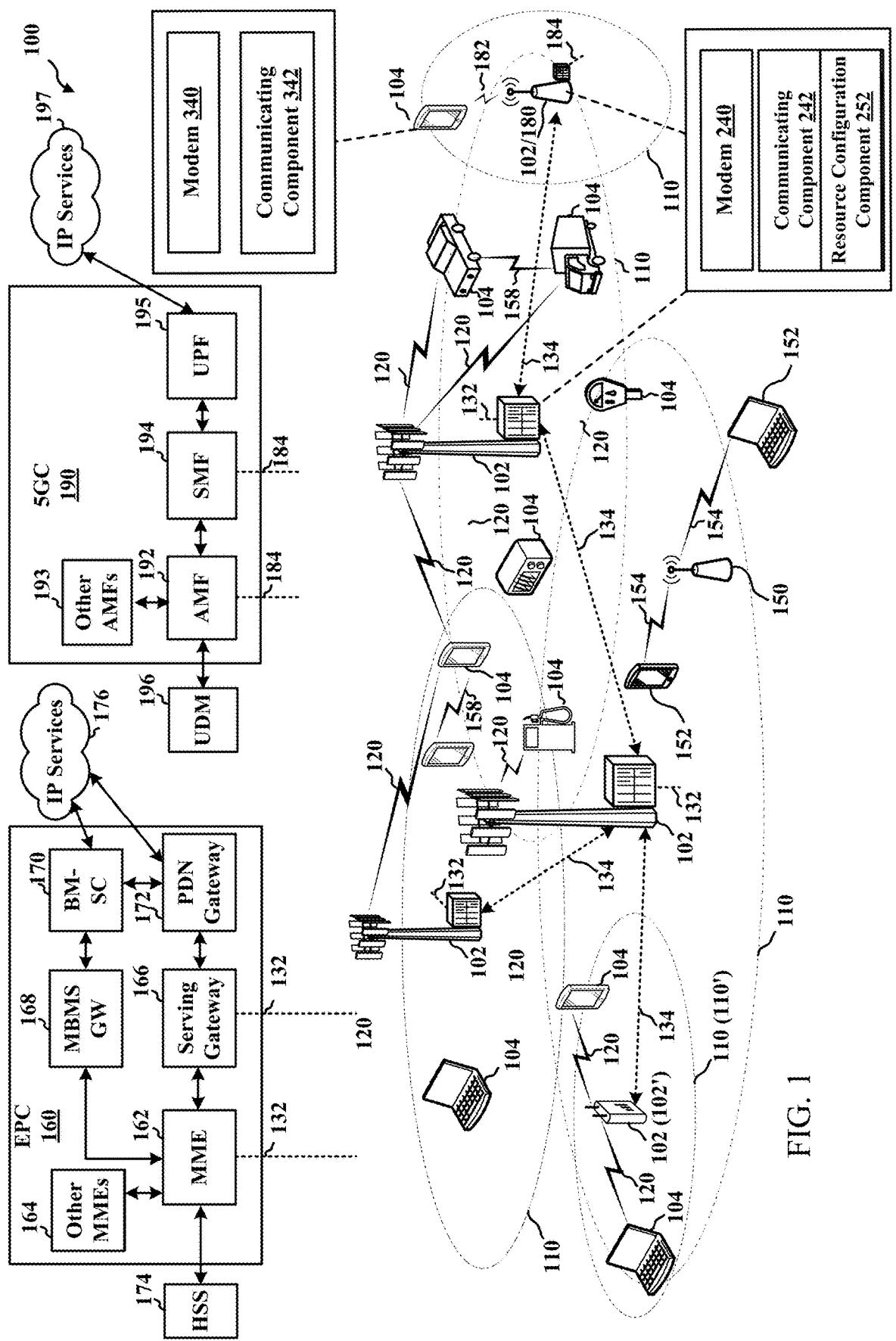
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to resource allocation in an integrated access and backhaul (IAB) system. Specifically, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as IAB nodes, where the wireless spectrum may be used both for access links (i.e., wireless links with user equipments (UEs)), and for backhaul links, which may be referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication. These backhaul communications can enable fast and easy deployment of highly dense small cell networks that are ideal for urban and suburban locations with potentially high populations but that otherwise lack hard-wired connections such as fiber.

Accordingly, a gNB such as an IAB-donor connected to a terminal end of the fiber can serve as a backhaul connection to enable surrounding gNBs and operators to deploy a new gNB (e.g., an IAB-node) that obviates the necessity of connecting additional fiber. Upon receiving signals from an IAB-donor node, the IAB node can relay the signals as appropriate to the next IAB-node to enable the IAB nodes to collectively communicate between parent and child nodes as described herein, or to communicate with UEs in the vicinity. The implementation of the IAB backhaul networks provide fast communication capability in dense urban and suburban environments with a minimum investment, which in turn can help facilitate fast 5G adoption.

For simplicity in this disclosure, a distributed unit (DU) node or a central unit (CU) node may also be referred to as a DU or a CU.

With respect to resource allocation, the current framework supports only per-cell resource configuration and a child-node may not be aware of a not-available (NA) resource configuration of a parent-node. Thus, for example, if a DU cell is serving two child nodes, there is a single DU cell specific resource configuration for both child nodes in the cell. In this example, the CU may provide a single child-cell configuration for both child nodes. This information may be insufficient for a DU to communicate with one of the child nodes. In addition, the child node may have unique capabilities and features that may not be able to be exploited to their maximum benefit give the cell-specific resource configuration currently in place. Accordingly, in one aspect of the disclosure, a central unit (CU) may be configured to provide certain "side information" to a DU including a per child or child-node specific link resource configuration. The DU may modify its resource configuration, which may include temporarily substituting its resource configuration with the side information when the DU is communicating with the child node. The modified resource configuration may take into account the child-node specific capabilities and limitations, such as its ability to simultaneously receive (or simultaneous transmit) signals, or its lack of a full duplex capability, for scheduled communications with the child node. The modified resource configuration of the DU cell may also take into account the child node's need to communicate with its own children via one or more cells served by the child node, or the presence of other cells serving the child node.

By being aware of the per child link resource configuration, as opposed to a per cell resource configuration, each parent DU may have more flexibility in scheduling, which may improve efficiency in the use of network resources. For example, a parent node with two child nodes may be able to take advantage of one of the child node's full-duplex capabilities while also taking into account the other child's inability to transmit using full-duplex. This technique is conventionally not possible given the stringent per-cell configurations provided to the DU, which cannot take these differentiating factors into account in its communications with the child node(s) and thereby cannot maximize bandwidth and efficiency.

Further, in some implementations, according to the present aspects, the DU may determine the side information and then use the side information to avoid attempting to transmit or receive communications with the child node during the time the child node is known to be communicating with its own children or with nodes of other serving cells, and then may communicate with the child node when the transmission medium is free. This preexisting understanding of the child node's configuration thereby can save power, avoid interference, increase overall efficiency.

As such, it would be desirable to implement such techniques in an IAB system. An IAB-node may have one or more mobile terminations (MTs), and one or more DUs (e.g., and each DU may be associated with one or more cells/sectors). Each entity (MT and/or cell) may also have one or more transmission/reception points (TRPs) for exchanging data with other nodes.

In one implementation, the present disclosure may include, for example, a CU that may act as a gNB and central network point contact for a wireless network of nodes, such as an IAB network. The present disclosure may also include at least one DU that may serve one or more child nodes including IAB-DU nodes, IAB-mobile termination (MT) nodes, or IAB nodes including both components. One of the DUs may serve one or more child nodes. In addition, the child nodes may be served by one or more additional parent nodes. The child nodes may be associated with their own cells in which they can communicate with grandchildren.

A DU may receive, from a CU, a message generated at the CU based on the CU's accumulated or prior knowledge of the IAB network configuration. The message received by the DU may include a resource configuration for a cell of the DU. That is to say, the DU may act as a gNB and can separately serve one or more child nodes. The message received by the DU may also include a resource configuration for a child cell corresponding to a child node served by the DU cell.

In various aspects of the disclosure, the CU prepares, generates and transmits a message to a DU that includes the DU cell-specific configuration, an identity of child nodes and/or cells, and other information. The CU may identify another cell, such as the DU's own cell, another parent cell serving the child node, etc., in the list of child cells. The CU also includes a resource configuration for the identified child cell. Upon receiving the message, the DU may compare the cell-related information for different parent or child nodes. Based on this and potentially other information, the DU may determine that the cell identifier (ID) for the child node in the received message is incorrect. The received cell ID may in fact be its own cell or the cell of another node in the IAB network. The DU thereupon recognizes that for the identified child node, the provided resource configuration for the child cell is in fact "side information" representing a child-node specific resource configuration. The DU may therefore modify the resource configuration of the DU cell serving the identified child node. For example, the DU may substitute the child-specific resource configuration information for its cell-specific configuration and may proceed to communicate via its cell with the child node using the substituted child specific resource configuration. Upon concluding the communications, the DU may change the cell configuration back to its original resource configuration.

Various additional different implementations for providing child-specific resource configurations are described below and throughout this disclosure. Initially, a description of various non-exhaustive features of different networks, systems, structures and devices in which the concepts of the present disclosure may be applicable is presented below with initial reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A)

are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 2:
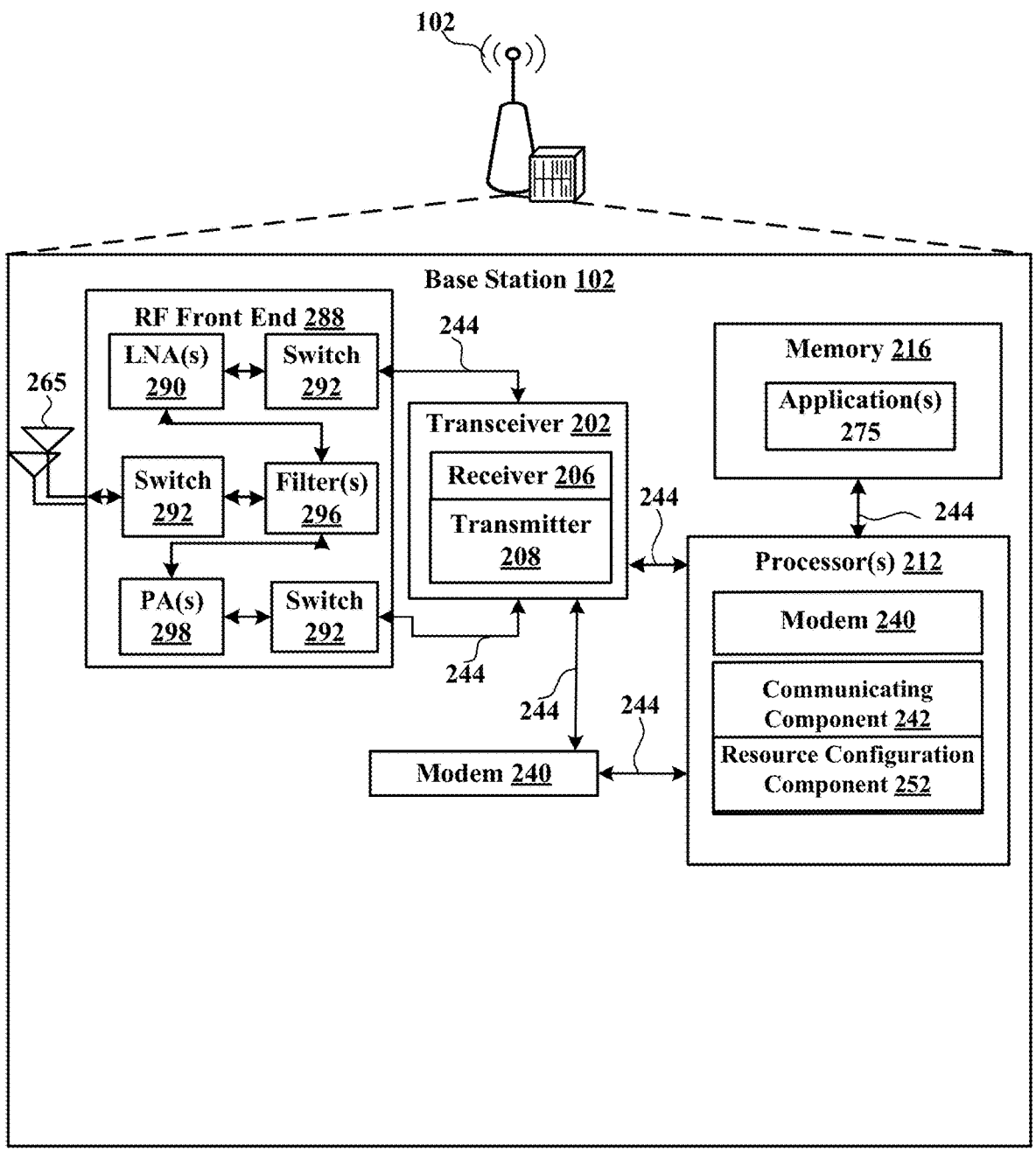
FIG. 2 is a block diagram illustrating an example of a network entity (also referred to as a base station), in accordance with various aspects of the present disclosure.

FIG. 1 is a diagram illustrating an example of a wireless communications system and an access network 100. FIG. 2 is a block diagram illustrating an example of a network entity (also referred to as a base station). Referring initially to FIG. 1, the wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes acting as an IAB node, such as base station 102/gNB 180, may have a modem 240, communicating component 242 for communicating with an IAB network over an F1AP or RRC link, or another communication link, and resource configuration component 252 for allocating resources, including the H/S/NA and TDD resources as described herein. The base station 102/gNB 180 acting as a CU may be responsible for the configuration of the IAB network. The resource configuration component 252 of the base station may prepare cell-specific resource configurations for hard (H), soft (S), and not available, and time domain resources such as UL (uplink communications), DL (downlink communications) of F (flexible directions). The resource configuration component 252 may also prepare other types of resource configurations. Component 252 may provide the resulting information for these cell specific (e.g., parent cell, DU cell, etc.) configurations and provide this information to the communicating component 242. The communicating component 242 may in turn package and arrange this information into a message destined for a DU over the F1 interface, and at a different time, into a message with time domain information over an RRC connection to the DU. More than one DU may interface with the CU in base station 180. The component 242 may provide these messages to modem 240 which may up convert the messages into an RF format and transmit these messages to the DU(s) via the appropriate wireless interface.

Though a base station 102/gNB 180 is shown as having the modem 240 and communicating component 242, this is one illustrative example, and substantially any node or type of node acting as an IAB node may include a modem 240 and communicating component 242 for providing corresponding functionalities described herein.

In addition, for purposes of this example, it is assumed that one of the terminals 104, rather than being a UE, may be an IAB-DU that may include an MT component as well for communicating with parent nodes, for example. The DU of 104 may receive the messages from the CU as described above, including the message with the H/S/NA configurations and the TDD information, via modem 340, which receives the signal via one or more antennas, retrieves the signal, and provides the signal to communicating component 342. The signal may be disassembled at component 342 and analyzed at the DU. The DU may transmit the resource configurations from the F1AP message to the other IAB nodes as described herein.

The DU in 104, in conjunction with the modem 340 and communicating component 342 (FIGS. 1 and 3), may be configured to perform the steps described previously with respect to receiving the F1AP message and determining the identifier(s) to correlate with another entity, such as the DU itself in the implementation where the DU uses the listed child configuration to communicate with one or more child nodes on a per child basis. The DU in 104 is similarly configured to perform the other steps of equating the identifier with one or more nodes that serve the child node, or that are served by the child node, etc. The DU may be configured to perform the steps associated with temporarily using this side information to modify one or more resource configurations in view of the capabilities and scheduling constraints of the child node(s) as determined by the DU. In some configurations, the CU and the associated components 240, 242 and 252 are configured to organize this information and provide the necessary resource configuration messages to the DU. The CU and its components may also be configured to receive requests from the DU to modify the TDD configuration to resolve a conflict with the cell-specific configurations as described above. The DU may be configured to perform the various steps to enable other parent nodes to access the child node by conferring resources to those parent nodes, as described in the steps above. The DU is configured to have preexisting knowledge of the deliberate identifications (or misidentifications) of the various identifiers and the use of the child configuration information (or other cell configuration information) to provide to the DU side information, including misidentifying child cell configuration IDs, whether intentionally or otherwise, that in turn can be used by the DU to selectively communicate with a child node and to allow the child node to have sufficient resources to communicate with its children.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a video camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4:
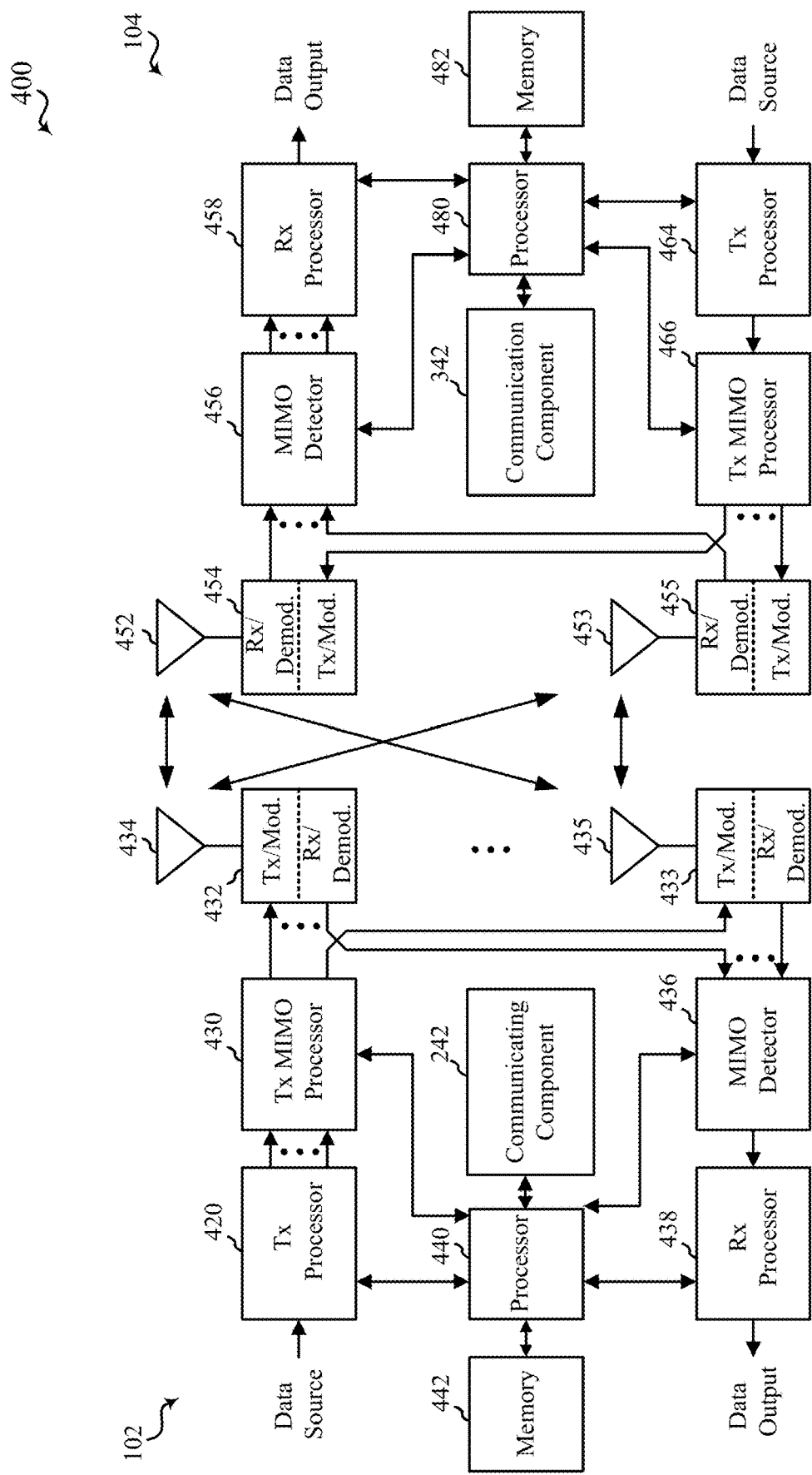
FIG. 4 is a block diagram illustrating an example of a MIMO communication system including a base station and a UE, in accordance with various aspects of the present disclosure.
Figure 5:
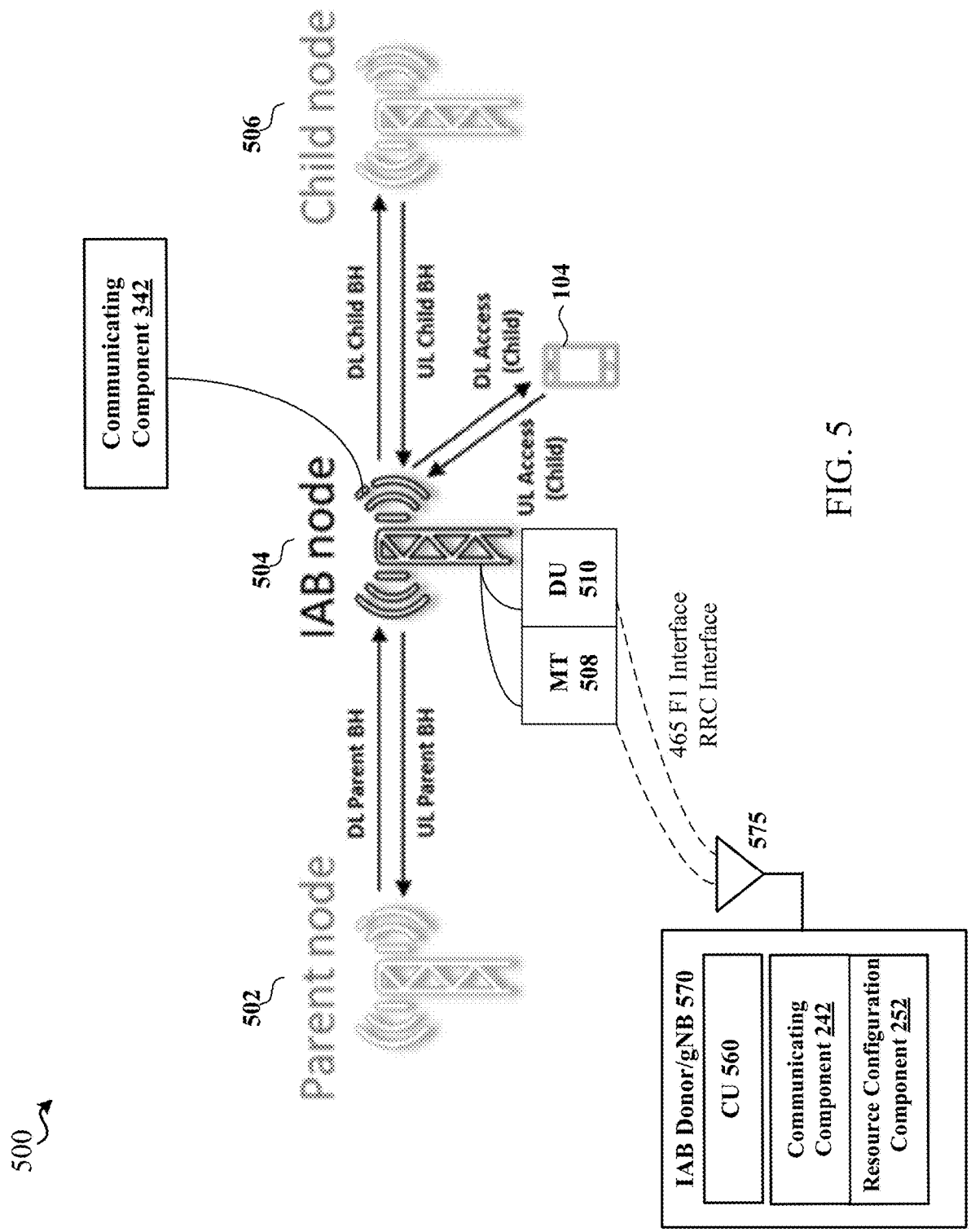
FIG. 5 is a diagram of an example integrated access and backhaul (IAB) system, in accordance with various aspects of the present disclosure.
Figure 6:
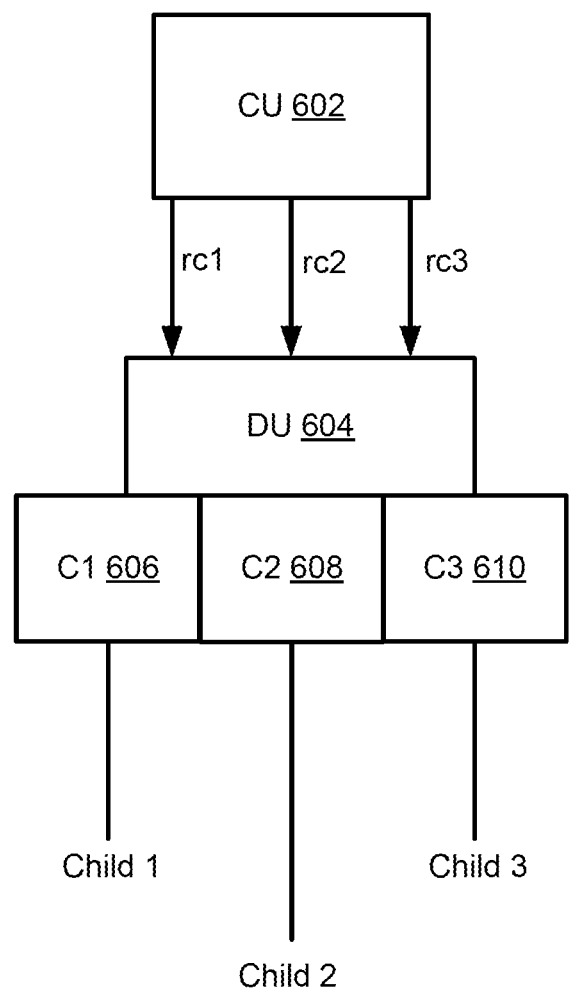
FIG. 6 is a diagram of an example IAB system for allocating resources in accordance with various aspects of the present disclosure.
Figure 7:
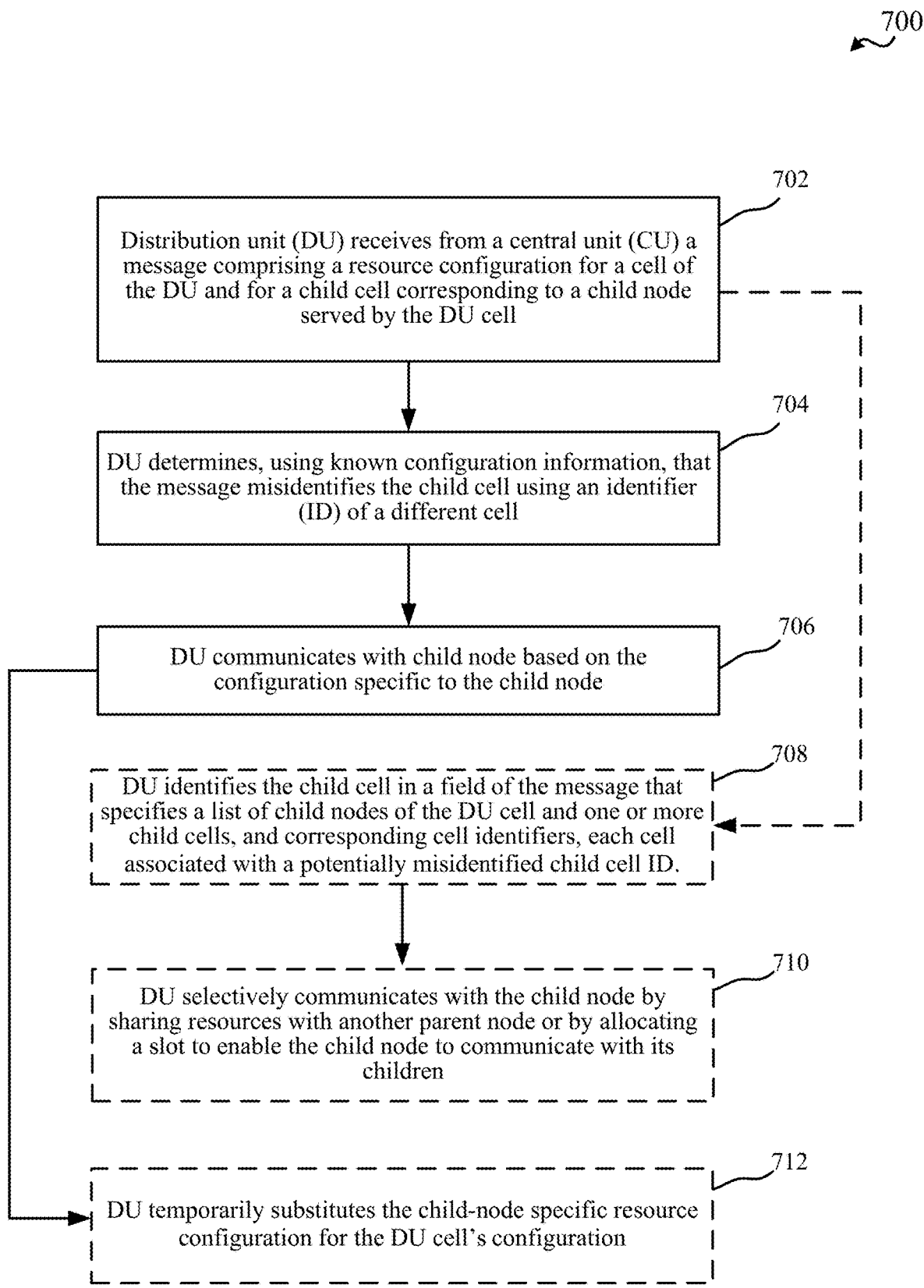
FIG. 7 is a flow chart illustrating an example of a method for wireless communications at a node such as an IAB node in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 6 and 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of a node acting as an IAB node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for resource allocation.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Where the base station 102 is configured as a CU, the base station can be configured to use the communication component 242 and the resource configuration component 252 to provide to a CU a message of the F1AP interface. As an example, referring to a proposed implementation in the 3GPP specification, the CU and resource configuration component 252 may be configured to prepare a GNB-DU RESOURCE CONFIGURATION information element (IE) which includes a gNB-DU Cell Resource Configuration (IE) for sending to the DU, which includes the resource configuration information used for data transmissions between nodes.

In an aspect, the processor(s) 212 may correspond to one or more of the processors described in connection with the UE in FIG. 8. Similarly, the memory 216 may correspond to the memory described in connection with the UE in FIG. 8.

Figure 3:
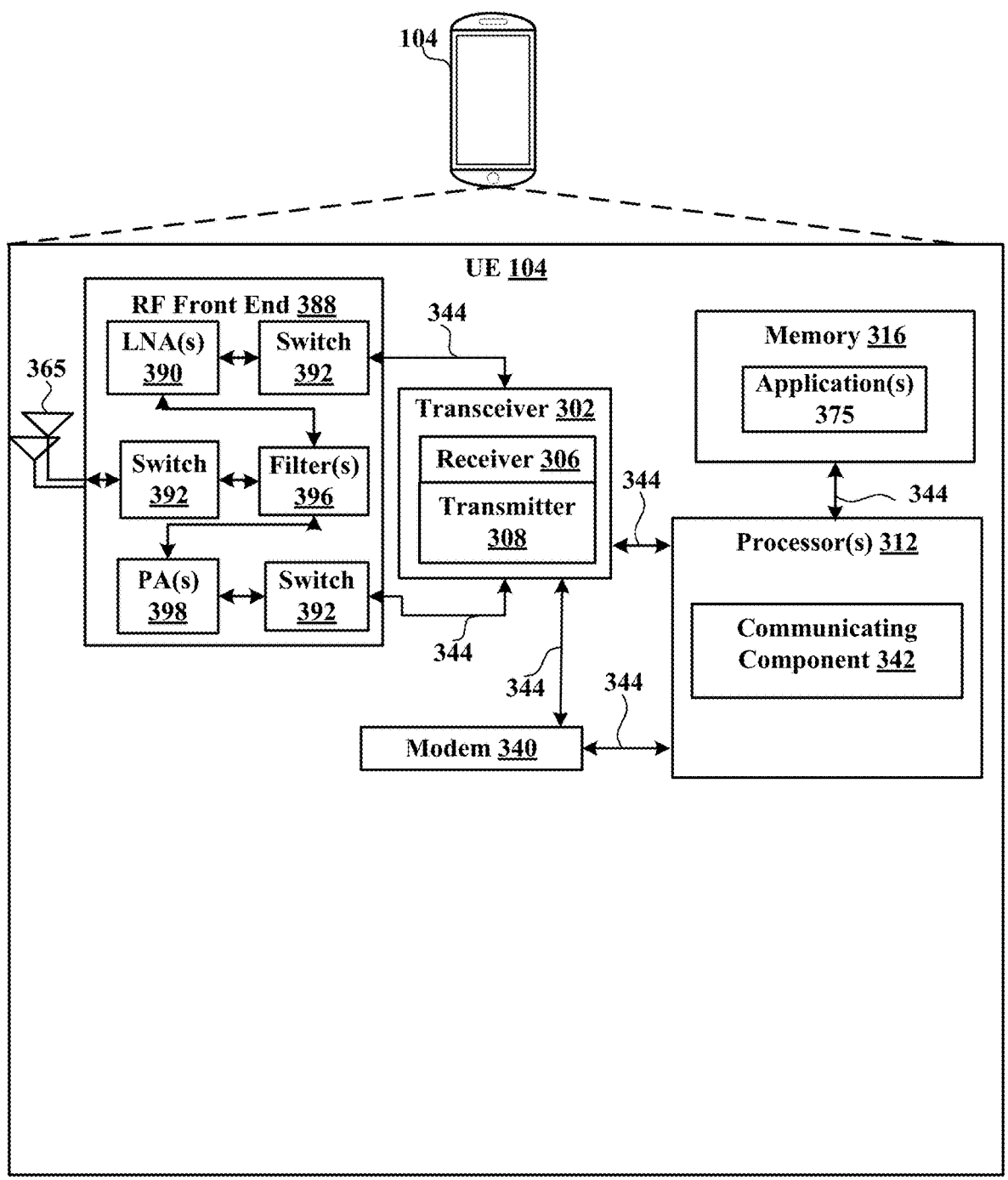
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340. The processor(s) 312 may include communicating component 342, which, when the UE is acting as a DU, can be used to receive and review resource configuration messages from the CU such as those described above.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 4. Similarly, the memory 316 may correspond to the memory described in connection with the base station in FIG. 4.

FIG. 4 is a block diagram of a MIMO communication system 400 including a base station 102, which may be acting as an IAB node or a parent node, and a UE 104. The MIMO communication system 400 may illustrate aspects of the wireless communication access network 100 described with reference to FIG. 1. The base station 102 may be an example of aspects of the base station 102 described with reference to FIG. 1. The base station 102 may be equipped with antennas 434 and 435, and the UE 104 may be equipped with antennas 452 and 453. In the MIMO communication system 400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 420 may receive data from a data source. The transmit processor 420 may process the data. The transmit processor 1020 may also generate control symbols or reference symbols. A transmit MIMO processor 430 may perform spatial processing (e.g., precoding) on data symbols, control symbols, or reference symbols, if applicable, and may provide output symbol streams to the transmit modulator/demodulators 432 and 433. Each modulator/demodulator 432 through 433 may process a respective output symbol stream (e.g., for OFDM, etc.) to obtain an output sample stream. Each modulator/demodulator 432 through 433 may further process (e.g., convert to analog, amplify, filter, and up convert) the output sample stream to obtain a DL signal. In one example, DL signals from modulator/demodulators 432 and 433 may be transmitted via the antennas 434 and 435, respectively.

The UE 104 may be an example of aspects of the UEs 104 described with reference to FIGS. 1 and 2. At the UE 104, the UE antennas 452 and 453 may receive the DL signals from the base station 102 and may provide the received signals to the modulator/demodulators 454 and 455, respectively. Each modulator/demodulator 454 through 455 may condition (e.g., filter, amplify, down convert, and digitize) a respective received signal to obtain input samples. Each modulator/demodulator 454 through 455 may further process the input samples (e.g., for OFDM, etc.) to obtain received symbols. A MIMO detector 456 may obtain received symbols from the modulator/demodulators 454 and 455, perform MIMO detection on the received symbols, if applicable, and provide detected symbols. A receive (Rx) processor 458 may process (e.g., demodulate, deinterleave, and decode) the detected symbols, providing decoded data for the UE 104 to a data output, and provide decoded control information to a processor 480, or memory 482.

The processor 480 may in some cases execute stored instructions to instantiate a communicating component 242 (see e.g., FIGS. 1 and 2).

On the uplink (UL), at the UE 104, a transmit processor 464 may receive and process data from a data source. The transmit processor 464 may also generate reference symbols for a reference signal. The symbols from the transmit processor 464 may be precoded by a transmit MIMO processor 466 if applicable, further processed by the modulator/demodulators 454 and 455 (e.g., for SC-FDMA, etc.), and be transmitted to the base station 102 in accordance with the communication parameters received from the base station 102. At the base station 102, the UL signals from the UE 104 may be received by the antennas 434 and 435, processed by the modulator/demodulators 432 and 433, detected by a MIMO detector 436 if applicable, and further processed by a receive processor 438. The receive processor 438 may provide decoded data to a data output and to the processor 440 or memory 442.

The components of the UE 104 may, individually or collectively, be implemented with one or more ASICs adapted to perform some or all of the applicable functions in hardware. Each of the noted modules may be a means for performing one or more functions related to operation of the MIMO communication system 400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 400.

In cases where the UE 104 including the modem 340 and communicating component 342 in FIG. 1, the UE and associated circuitry of FIG. 3, and the UE 104 of FIG. 4 act as a DU, then any one or more of these components may include means for receiving, from a central unit (CU), a message comprising a resource configuration for a DU cell and a child cell corresponding to a child node served by the DU cell; means for determining, based on known configuration information at the DU, that the message misidentifies the child cell by specifying an identifier (ID) of a different cell; and means for communicating with the child node based on a modified configuration specific to the child node. The DU may be implemented using any of the features described therein, as well as the additional features or capabilities disclosed with reference to any of FIGS. 5-11, below.

Further, FIG. 5 is a diagram of an uplink and downlink communication scheme in an IAB system 500, as described herein. In one example, the IAB system 500 may include an IAB node 504, which may be similar to or the same as the base station 102. The IAB system 500 may further include a parent node 502, a child node 506, and a UE 104. For example, in an IAB system, an IAB node 504 can transmit uplink data towards the parent-node 502, and receive the uplink data from the UE 104 and/or child node 506. The IAB node 504 may also transmit downlink data towards the child node 506, and receive the downlink data from the parent node 502.

In some aspects, the IAB node 504 may host two NR functions: (i) a mobile terminal or MT 508, used to maintain the wireless backhaul connection towards an upstream IAB-node or IAB-donor, and (ii) a distribution unit or DU 510 to provide access connection to the UEs or the downstream MTs of other IAB-nodes. The DU 510 may connect to a CU 560 hosted by the IAB-donor 570 by means of the NR F1 interface 565 running to and from antenna (or antenna array) 575 over the wireless backhaul link. The CU 560, which in this example is included in IAB-donor/gNB 570, may also send time-domain resource configuration information in an RRC connection with DU 510. Therefore, in the access of IAB nodes and donors there may be a coexistence of two interfaces, i.e., the Uu interface (e.g., between the UEs and the DU of the gNBs) and the aforementioned F1 interface.

The IAB node 504 may include the communicating component 242, which may be configured to determine a spatial relation between a first communication of a DU 510 entity and a second communication of one of the DU entity or a co-located MT 508 entity. The IAB node 504 may further configure a beam of at least one of the MT 508 or the DU 510 based on the determined spatial relation, and communicate using the beam with at least one entity. The communicating component may be further configured to receive and read resource configuration messages sent over the F1 interface from the CU, and to perform various actions in connection with the processors and other circuits of the IAB-node 504 with the DU 510 entity.

In an aspect, an IAB-node MT, e.g., a UE, may be provided TDD configurations and slot format indications (SFI). Specifically, the IAB-node MT is provided the same TDD configurations (e.g., the TDD_UL_DL_Configuration-Common IE that may be broadcasted in SIB1) as UEs, and may additionally be provided dedicated TDD configurations (e.g., the TDD_UL_DL_ConfigDedicated_IAB_MT IE, similar to 3GPP's use of the IE TDD_UL_DL_ConfigDedicated but that also supports new slot configurations that begin with uplink symbols). These configurations may be sent directly to the IAB-MTs, including the child node, via RRC connections. The IAB-MT may also be provided SFI (via DCI). However, the SFI table has been extended for IAB to include new slot formats.

In an aspect, an IAB-node DU may be provided, by the CU, an indication for a slot format over a number of slots by IAB-DU-Resource-Configuration. The DU-Resource-Configuration indicates both the downlink/uplink/flexible (D/U/F) type of resources, as well as hard/soft/not-available (H/S/NA). The indication of D/U/F resources in the semi-static DU resource configuration includes the following: the flexibility to configure all of the slot patterns and formats supported by the existing 3GPP TDD-UL-DL-Config RRC IE configurations and slot format table; and new slot formats defined only for IAB nodes (DU and MTs) which begin with uplink slots, uplink symbols, or flexible symbols. Additionally, H/S/NA attributes for the per-cell DU resource configuration may be explicitly indicated per-resource type (D/U/F) in each slot.

Further, in an example, a parent IAB node/donor may be provided with the full D/U/F and H/S/NA resource configuration of each child IAB-DU. This extra information can include different exemplary uses. For one, a parent-node with the knowledge of a child DU resource configuration (and the multiplexing capabilities of the child) may avoid potential conflicts. For example, if the same set of resources are allocated as hard to both parent-node and the child-node then the parent-node may avoid communicating with the child over those resources. In another example, a parent-node may know the configuration of soft resources of the child for sending the availability indication. In still another example, a child-node may need a guard period when switching between communicating over parent-backhaul (BH) link (MT TX or MT RX), and communicating over the child-links (DU TX or DU RX). Different signaling techniques can be used where a child-node may request for guard symbols (per switch type), and a parent-node may indicate the amount of guard symbols (per switch type) it is willing to provide. To determine the location and amount of such guard symbols, the child resource configuration should be known by the parent-node in this example.

FIG. 6 is a diagram of resource allocation in an IAB system 600, as described herein. In one example, the IAB system 600 may include an IAB node, which may be similar to or the same as the base station 102. IAB system 600 may include a CU 602, DU 604, one or more child DUs 606, 608, 610 and child nodes 1, 2, and 3.

In an aspect, one drawback of the current framework is that the current framework supports only per-cell resource configuration. That is, a DU 604 may comprise multiple cells, and for each cell the DU is provided a D/U/F and H/S/NA resource configuration. Accordingly, being able to configure resources per child-link provides a flexibility to the network to better utilize the resources. As such, with the knowledge of the child resource allocation, various per-child resource configurations may be effectively created at the parent-node. For example, Parent-node DU resource configuration: [slot n, slot n+1]=[H, H]
Child 1 DU 606: [slot n, slot n+1]=[H, NA]
Child 2 DU 608: [slot n, slot n+1]=[NA, H]
The parent-node DU 604, with the knowledge of child 1 606 and 2 608 allocated resource, may infer that:
For communicating with child 1 606: [slot n, slot n+1]= [NA, H]
For communicating with child 2 608: [slot n, slot n+1]= [H, NA]

In an aspect, for a multi-parent configuration, child C may be connected to two parent nodes P1 and P2, and due to half-duplex constraints, C may need to use TDM communications with P1, P2, and their own children. For example, C may be configured to communicate with P1 and P2 during slots n and n+1 respectively, and then C may communicate with its own children during slot n+2: C's DU resource configuration: [slot n, slot n+1, slot n+2]=[NA, NA, H].

Further, parent node 1 (P1) and parent node 2 (P2) may have additional children, and may provide resources to these additional example resources:

P1 DU resource configuration: [slot n, slot n+1, slot n+2]=[H, H, H]
P2 DU resource configuration: [slot n, slot n+1, slot n+2]=[H, H, H]

P1 may be configured for communication with child C: [slot n, slot n+1, slot n+2]=[H, NA, NA], which in this arrangement cannot be inferred from the knowledge of the DU resource configuration of CU of [NA, NA, H]. (because [H, H, H]−[NA, NA, H]:=[H, H, NA]). Thus, the present disclosure provides apparatus and methods that enable allocating resources per child-link and not per-cell.

In another aspect, a further drawback of the current framework is that the child-node may not be aware of an NA resource configuration of a corresponding parent-node (parent DU). If some resources are NA for the parent-node, then no DL/UL communication may occur between the child and parent-node within those resources. Without the knowledge of allocated resources of the parent-node, the child may attempt to receive (RX) or transmit (TX) signals within NA resources. This may result in implications, such as, but not limited to, power consumption, interference, and incorrect inference of the channel/link quality at the child-node. Furthermore, such resources may have been used for other communications of the child-node (e.g. communication with grand-children, or with another parent). Accordingly, the present disclosure provides apparatus and methods that enable providing a child-node with (or at least part of) H/S/NA configuration of the parent-node.

The other shortcoming of the above implicit method is that if the child-node declares it has enhanced multiplexing capability (that is, it does not require its parent-BH communication to be time-division multiplexed with its child communications), then even if the parent node is provided a copy of the child-node IAB-DU's resource configuration, it may not back off from using the overlapping resources, since it assumes the child-node is capable of handling concurrent communications.

Various aspects of the present disclosure may use the framework of a conventional message sent from the CU to the DU to provide. In one implementation, the message sent to the DU may include one or more fields identifying information including a list of child cells of the DU. The list may include an ID of the child cell along with a resource configuration for the child cell. The DU receiving the message may review the list and determine that for one or more of the listed child cells, the message misidentifies the child cell using an ID of a different cell. The DU, configured to recognize this misidentification as a prompt to receive certain side information, may use the resource configuration of the misidentified child cell, e.g., instead of the DU cell's own cell-specific resource configuration, to communicate with the child node. The side information is in fact a child-node specific resource configuration that enables the DU to properly communicate with the child—i.e., in a way that maximizes efficiency by taking into account the child node's need to exchange information with cells of parent nodes or with the child's own children nodes.

FIG. 7 is a flow chart 700 illustrating an example of a method for wireless communications at a node such as an IAB node in accordance with various aspects of the present disclosure. The steps of 700 may be performed, for example, by the DU, including any IAB-DU node as described in connection with FIG. 1 (the IAB node including modem 340 and communicating component 342), FIG. 5 (DU 510 of IAB node 504), and FIG. 6 (DU 604). At 702, a DU receives from a central unit (CU) a message comprising a resource configuration for a cell of the DU and for a child cell corresponding to a child node served by the DU cell. At 704, the DU determines that the message misidentifies the child cell using an identifier (ID) of a different cell. The DU in this case is aware that the misidentification is not intended to represent an error, but rather is a mechanism that the CU is using to provide the DU with side information. At 706, DU communicates with child node based on the configuration of the child cell. As noted above, the configuration of the child cell set forth in the message includes child-node specific information that the DU can use to modify (including substitute altogether, as in the implementation of step 712) its own cell-specific resource configuration.

The dashed rectangles in FIG. 7 and in other figures with flow diagrams represent features that are optional or exemplary implementations. The aspects of the disclosure may more broadly extend to additional child nodes, for example. At 708, which as noted by the line and arrow is an exemplary portion of the step 702, the DU identifies the child cell information in a field of the message that specifies a list of child nodes of the DU cell and one or more child cells, and corresponding cell identifiers of these child cells, with each cell being associated with a potentially misidentified child cell ID. Thus, in this exemplary implementation, the DU may use more than one child-specific resource configuration to communicate with several of its children (if it has multiple children) such that the resource configuration used is specific to the child node during that communication. An exemplary framework of this list is identified below. In addition, as discussed herein, the child-node specific configuration may facilitate efficient communications by allowing the child node slots for communicating in uplink or downlink (or both) with one or more of its parent cells, and one or more of its children nodes. An example of this feature is shown in step 710.

In an implementation, as noted, the DU may instead determine that the different cell is associated with another parent cell of the child node (see step 708). The configuration associated with the child cell and used by the DU may include the side information that informs the DU that the child node needs to be allotted a time period to communicate with the parent cell at issue. Accordingly, the DU may communicate with the child node based on the listed configuration of the child cell in the message, which includes this side information. In this manner, the DU can take into account a per-child or child-node specific configuration to enable the DU to share communications with the different cell, or the other parent node of the child cell. The DU can also selectively communicate with different of its children nodes in a single cell using the resource configuration of one (or more) of the children.

In other implementations, the child node list may include a plurality of listed child nodes with identifiers that correspond to other cells (708). These other cells may be other parents of this child node. For example, the listed child nodes may include more than one parent of a single child node, or a plurality of parents of different children nodes of the DU. In each case, the DU can temporarily modify the resource configuration(s) to take into account the communication needs of the parent or child nodes. Absent this ability, the DU would be relegated to its own cell-specific configuration, which would either cause unnecessary backing off the DU to unnecessarily defer to a child node or due to the DU's ignorance of the child node's duplex capabilities, or which may cause interference between nodes and therefore network errors.

The message described herein and the various equipment coupled to the network are monitored by the CU. Thus the CU is the center of intelligence and is responsible in this implementation for generating and preparing the resource configurations. The CU is the entity that determines the side information to provide based on a number of factors relevant to the IAB network described herein, including the capabilities of the IAB-DU and IAB-MT nodes.

Figure 8:
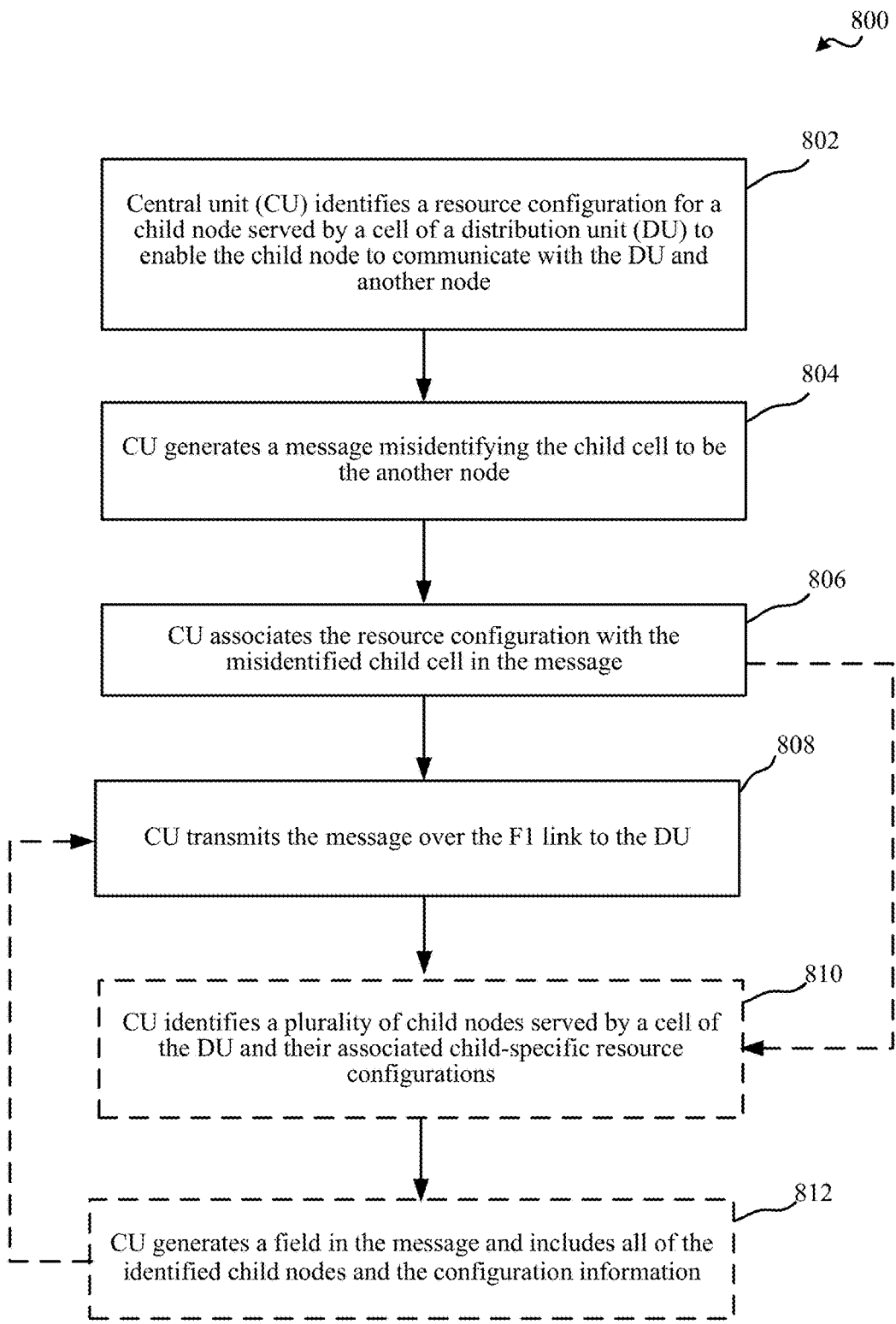
FIG. 8 is a flow chart illustrating an example of a method for wireless communications at a node such as an IAB node in accordance with various aspects of the present disclosure.

FIG. 8 is a flow diagram 800 illustrating an exemplary method of a CU. The steps of FIG. 8 may be performed, for example, by the base station 180 in FIG. 1 acting as a CU (which may include resource configuration component 252, communicating component 242, and modem 240), the base station 102 in FIG. 2 (configured as a CU), CU 560 of FIG. 5, and CU 602 of FIG. 6. Beginning at 802, the CU identifies a resource configuration for a child node served by a cell of a distribution unit (DU) to enable the child node to communicate with the DU and another node. At 804, the CU generates a message misidentifying the child cell to be the other node. At 806, the CU associates the resource configuration with the misidentified child cell in the message. Thereupon, at 808, the CU transmits the message over the F1 link to the DU.

In optional aspects, such as in a more complex implementation of an IAB network where the DU cell may serve a number of children, the CU may take greater advantage of the message to the DU. For example, referring back to 806, after associating a resource configuration with a misidentified child cell, the CU may proceed at step 810 to identify a plurality of child nodes served by a cell of the DU and their associated child-specific resource configurations. Having determined this information, at 812, the CU generates a field in the message and includes all of the identified child nodes and the configuration information. Then, as shown by the dashed arrow referring back to step 808, the CU transmits the message over the F1 link to the DU.

In another aspect of the disclosure, a technique for wireless communications may include the DU receiving from a CU a message including resource configurations for a DU cell and a child cell corresponding to a child node served by the DU cell. The DU cell may identify a field in the message specifying the child node served by the DU cell (or more than one such child node) and an identifier of the corresponding child cell. The DU may determine that the identifier of the child and DU cells in the message to be identical. This determination, rather than being in error (in the same vein as the above implementation with the different cell), may inform the DU that the associated resource configuration listed for the child cell is in fact a child-specific configuration that takes into account the capabilities or limitations of the child. (In other examples, the child node list may include a plurality of child cells, each having identifiers equal to the DU for the same reasons). The DU, as in the previous implementation, communicates with the child node based on the configuration of the child cell.

For example, the cell specific configuration of the DU can be temporarily changed to the configuration provided with the child cell in the message. In some alternative implementations, the DU's cell configurations can be modified in part to incorporate the side information needed to provide a child-node specific resource configuration when communicating. In another arrangement similar to the above, the child cell configuration identified by the DU may provide child-node specific configuration information that identifies to the DU that the child node needs to communicate with its own children in one or more slots (e.g., via one of the cells associated with the child node). In the latter case, the DU may exchange uplink or downlink data with that child node per the side information, but the DU may also back off per the modified configuration to allow the child node to exchange data with its children for another slot, or to allow one or more other parents (e.g., IAB-DU nodes) to exchange data with a shared child node. For example, the DU may be associated with one or more cells (e.g., cells 1-10), and a child of the DU may be associated with one or more other cells (e.g., cells 11-20). The present disclosure allows the DU to exact and implement child-node specific or per-child node resource configurations such the DU can use a plurality of temporary configurations to enable DU cells exchange data with one or more child nodes in each of its cells at or near a maximum capacity set by the duplex capabilities and scheduling limitations of the children.

In the implementation described above, the configuration of the child cell, which is provided in the list of one or more child cells, is the child-node specific side information that the DU may use, in its identified form or by modifying the DU's configuration, to communicate with the child node. For purposes of this disclosure, communicating with the child node may include not only the actual uplink or downlink (or full duplex) communication between the DU and the child node, but it may also refer to a mixed communication where the DU is communicating with the child node using one or more of time, frequency, or spatial multiplexing techniques, and where the DU defers communicating to allow another node to communicate with the child node in a next slot (after which the DU may engage the child node in still another slot, in some cases). For example, the communication may involve a plurality of slots (n, n+1, n+2, etc.) in which the DU cell may be exchanging data with the child in one slot but may be backing off in another slot where the child node is unavailable, e.g., for the reasons described above.

A main difference between the present implementation and the prior implementation is that, in the prior-described implementation, the child cell ID could be a different cell in the IAB network, whereas in the present implementation the identifier is that of the DU's serving cell. Otherwise, the implementations are similar: Based upon recognizing that the identifier of the child cell in the message sent by the CU is identical to the DU's own cell, the DU may use the child cell configuration (or it may modify the DU's own configuration, as appropriate) to account for the child node's resources.

In an implementation, the child node may include an IAB-MT node, such that the child node is the terminating device. Since the DU and MT are logical components (but are also used herein for simplicity to describe the node configured with the logical components), an IAB node may include both a DU and MT component. Thus, a node with a DU component may have one or more cells for serving other children nodes. In an implementation, the messages sent are F1 Application Protocol (F1AP) messages and the corresponding links are F1 links, although this not need be the case and the principles herein may be extended to other network types in which the links and message format differ.

Figure 9:
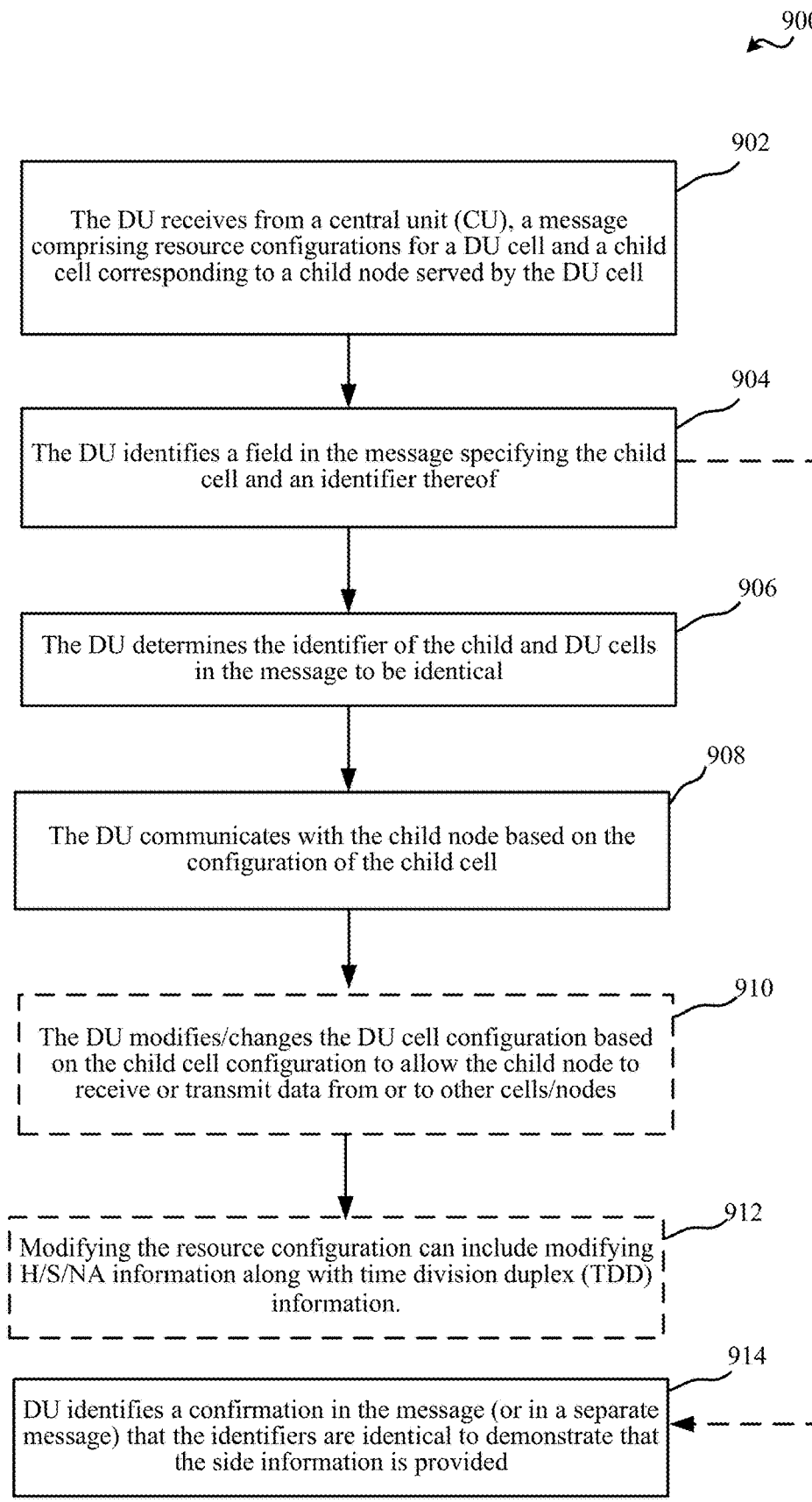
FIG. 9 is a flow chart illustrating an example of a method for wireless communications at a node such as an IAB node in accordance with various aspects of the present disclosure.

FIG. 9 is a flowchart 900 of wireless communications of the DU describing the present implementation. The steps of 900 may be performed, for example, by the DU, including any IAB-DU node as described in connection with FIG. 1 (the IAB node including modem 340 and communicating component 342), FIG. 5 (DU 510 of IAB node 504), and FIG. 6 (DU 604), or by the UE in FIGS. 3 and 4 configured to function as an IAB-DU. At 902, as before, the DU receives from a central unit (CU), a message comprising resource configurations for a DU cell and a child cell corresponding to a child node served by the DU cell. Thereafter, at 904, the DU identifies a field in the message specifying the child cell and an identifier thereof. In this case, however, at 906, the DU determines the identifier of the child and DU cells in the message to be identical. As a result, at 908, the DU communicates with the child node based on the configuration of the child cell. For example, in 910, the DU modifies the DU cell configuration based on the child cell configuration to allow the child node to receive or transmit data from or to other cells/nodes. As described above, modifying, changing, or otherwise substituting the resource configuration information can include changing the H/S/NA configuration as well as the TDD information (912). In another implementation, at 914, the DU may also identify a confirmation that is set forth in the message (or in some arrangements, in another message) that confirms that the identifiers were deliberately set equal and that the occurrence is not in error. With this confirmation, the DU is made aware with additional reliability that the message is accompanied by child-specific side information that will be useful in subsequent communications over the network.

While the resource configurations may vary depending on the configuration, the time division duplex information may include information about direction of the communication: uplink (the resource will be used for exchanging data or signals in the uplink direction), downlink (same as uplink but for the downlink direction), and flexible. A flexible configuration ordinarily means that the resource may be used in both uplink and downlink directions.

In addition, the DU resource configuration can include, for example, hard (H), soft (S), or not available (NA) communication modes as described above. The hard configuration means that the DU can use the communication resource to exchange data with a child node. Since the conventional resource configurations are cell, rather than child node, specific, the hard configuration enables the DU to use the resource to communicate with the child node without considering the capabilities or limitations of the child node. Thus, if a DU has a hard configuration for a given slot or resource, it can transmit to a corresponding node, but the parent node to the configured DU must assume that it cannot transmit to the DU in that slot. The soft configuration for a DU means that the DU can use the slot conditionally, i.e., the DU can use the slot only if it does not impact the corresponding MTs scheduling.

The confirmation information described with respect to step 914 may include a simple indication bit conveying to the DU that the identifier of the child cell in the list of (one or more) child cells is deliberately set that to that of the DU cell, meaning that the resource configuration can reliably be deemed to include a configuration specific to the child node associated with that cell. This confirmation helps assure the parent node that the equivalence of the identifiers is not an artifact or error, but rather is a deliberate match to provide a per-child configuration.

The message sent from the CU to the DU may vary in different implementations, but in one implementation, the message sent includes information using, at least in part, the IAB 3GPP framework. The nature and content of the message is described in a gNB-DU Cell Resource Configuration information element that includes resource configuration information including an indication of D/U/F and H/S/NA resource configurations as described herein. The message includes resource configurations for intended recipients of the message and nodes relevant to that recipient. For example, the recipient of the message includes a DU and the message informs the DU about its cell configuration for scheduling network communications. The message also includes content relevant to children nodes/cells corresponding to a child node served by the DU cell(s).

Yet another implementation involves for example the above message and the above-described techniques. In this more specific implementation, the DU determines an identifier of the child cell and another DU cell serving the child node in the message from the CU to be identical. As per other implementations above, the list of child cells served by the DU may include this child cell identifier and a corresponding resource configuration. The difference here is that the identifier corresponds to another DU cell serving the child node.

Having determined that the child cell identifier is set equal to another DU cell serving the child node, the DU may proceed to communicate with the child node using scheduling based on the configuration of the child cell. An illustration of the desire for this scenario is when the child node has one or more additional parent nodes that it needs resources to exchange uplink or downlink communications with the serving cells of these different parent nodes. Conventionally, the limited cell specific information provided the DU would not allow the DU to take these communications into consideration. This information can be made known to the DU by identifying the resource configuration(s) in the child nodes.

Communicating with the child node based on a configuration of the child cell may include using the modified per-child configuration, which as expected is configured by the CU to enable the other parent DU cell of the child to communicate with the child node. Knowing the per child configuration by the DU allows the DU to share resources with the other parent nodes that need to communicate with the child nodes, e.g., via the parent cells.

Similar to the implementation above, the CU may provide a confirmation in the message, such as one or more bits for confirming that one or more of the respective child cells are in fact parents of the child node and that the listed child configurations include child-node specific or per-child node resource information for facilitating non-conflicting communications between other parent cells of the child node. In one aspect of the disclosure, the child node is an IAB-MT node.

It should be noted that, to provide resource configurations of one or more cells associated with other IAB-DUs that may also serve the child node, any of the above methods may be combined. Moreover, over a period of resource configuration updates, the CU may send different messages, each of which may provide side information tailored to the circumstances of that time period. In some cases, the other parent nodes of the child node are silent, but the grandchildren nodes have transmissions. Here, the identifier may be set to one type of node. When another configuration upgrade subsequently occurs, the situation may be reversed. The grandchildren may be idle, but the different parent nodes may be awaiting data from the child node. Thus the message can flexibly be modified to equate the child cell ID to a different node. Over the course of time, the DU may receive a plurality of messages that use different side information (e.g., a child cell identifier being equated to a cell of another IAB-DU node) to predict the needs of different cells and to exchange the configurations to suit different nodes. Accordingly, without introducing additional signaling overhead other than to state a deliberate identifier of the child node to equate with another node and to provide a resource configuration, the DU can be given the child-node specific scheduling needs over time, and can coordinate the scheduling in accordance therewith.

As noted above, the logic behind the message is generated at the CU, which is informed about the overall configuration of the IAB network. Thus the CU may deliberately insert the identifiers described above in earlier implementations in order to provide the child-node specific information. The CU can make these predictions by learning different behaviors of the network over time, and can configure resources in a manner that maximizes network utility and efficiency. One benefit of the above implementations is that the CU can induce the recipient DU to perform this modified scheduling to accommodate other cells and nodes in the IAB network without introducing additional signaling formats. Instead, the CU can stick with the formats and cell-specific configurations in place under the current framework of NR IAB specifications, while beneficially increasing the capabilities of the IAB network itself.

In another implementation, in lieu of introducing the child-node specific side information via modifying the identifier, an additional field may be provided by the CU in the resource configuration message. The CU may provide the DU, for each of its one or more cells, two resource configurations for a particular child node. A first of the provided resource configurations is a cell-specific configuration to be used as a default configuration when serving any of its child nodes. A second of the provided configuration is a child-node specific configuration for the DU cell. When serving that particular child node, the DU may use the child-specific resource configuration (or modify its configuration to include part or all of the child-specific information. When serving other children, the DU continues to use the default cell-specific resource configuration. In some implementations, the CU may identify more than one child node of the DU in the message, and the CU may provide two configurations for each child node. Similar logic applies here: the DU uses the cell-specific configuration for child nodes for which it does not have a special configuration, and the DU uses the child-specific configuration for the child node identified in the message.

The benefits of the above implementation are similar in respect to the advantages described with respect to the other types of arrangements. In addition, in this implementation, the CU may provide child-specific information for one or more child nodes without having to set a deliberate misidentifier. Thus, at the expense of just a little more signaling overhead, the DU is accorded more flexibility in using the best resources to communicate with nodes in the network.

The above scenarios may extend in theory to an arbitrary number of additional cells, although practical limitations will usually dictate the maximum number of participating nodes. Nonetheless, network efficiency can be dramatically increased.

In another implementation that is in some respects an extension of the above arrangement in which another field was introduced, yet another field can be added to the message to identify a list of one or more cells served by (associated with) another IAB-DU, where one (or more) of the IAB-DU's cells is also serving the child node, and the resource configuration or each such cell. In this case, the DU may modify its first cell-specific configuration based on one of the identified configurations in the list of cells to communicate with one of more of its child nodes. The modification may entail, for example, modifying its default configuration in part or in whole based on the child-specific configuration associated with the other cell(s) to selectively communicate with the child node. Using this configuration will allow the child node to schedule any necessary communications with the cells of these IAB-DUs.

Significant benefits of each of these configurations enable the DU cell and other cells serving children in the IAB network to temporarily depart from the cell-specific resource configurations limitations imposed on the IAB architecture, to obtain side information in various ways that do not require substantial alterations or disruptions to the architecture, and to temporarily use that information to schedule resources for communication (e.g., H, S, NA, and UL, DL, F) that take into account configurations on a per-child node basis in lieu of cell-specific limitations. With these changes, the capabilities of two or more different child nodes can be taken into account and a full duplex child node can be used in full duplex, whereas a half-duplex child node is used in half duplex in the first instance. Bandwidth usage efficiency can be dramatically increased at the expense of little to, in some implementations, almost no additional overhead signaling requirements. In some implementations, the CU can combine both of the above fields to increase the scheduling flexibility of the DU, and the CU can also use the identifier scheme as a complement to these techniques for even more capability. In other examples, it may be more desirable to streamline the scheduling by selecting one or two of the above implementations, depending on factors like the network architecture, the number of nodes, and the like.

Figure 10:
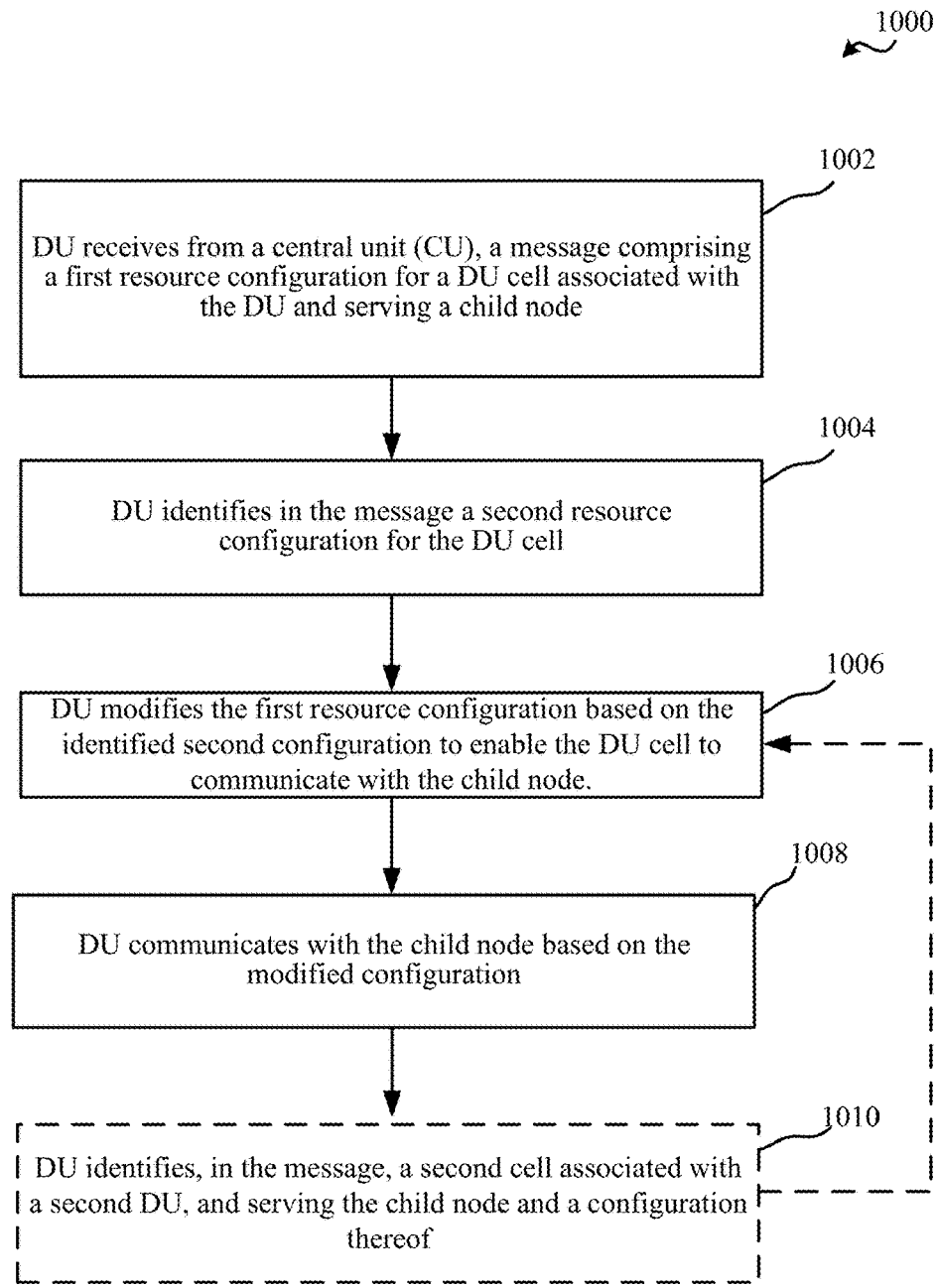
FIG. 10 is a flow chart illustrating an example of a method for wireless communications at a node such as an IAB node in accordance with various aspects of the present disclosure.

FIG. 10 is a flowchart for wireless communication involving the addition of fields in the message prepared and transmitted by the CU. The steps of FIG. 10 may be performed, for example, by the base station 180 in FIG. 1 acting as a CU (which may include resource configuration component 252, communicating component 242, and modem 240), the base station 102 in FIG. 2 (configured as a CU), CU 560 of FIG. 5, and CU 602 of FIG. 6. At 1002, the DU receives from the CU the message which includes a first resource configuration for a DU cell associated with the DU and serving a child node. Thereupon, at 1004, the DU identifies in the message a second resource configuration for the DU cell. As described in the implementation above, the message may include a separate field for the child node which includes the first and second resource configurations in 1002 and 1004 of FIG. 10. Next, at 1006, the DU modifies the first resource configuration based on the identified second configuration to enable the DU cell to communicate with the child node. At 1008, the DU may communicate with the child node based on the modified configuration, which implicitly allows one or more slots for the child node to communicate with another node if necessary.

Referring still to FIG. 10, in an additional embodiment described above, a field in the message may include information about another cell associated with another DU that is serving the child node. At 1010, the DU identifies a second cell associated with a second DU in the message, where the second cell is serving the child node. The DU can then modify the resource configuration to communicate with the child node. While both fields in FIG. 10 may coexist if a priority or order is provided the DU, in the case where it is not desirable to add further signaling overhead, then step 1010 may optionally be in a separate implementation from the remaining portion of FIG. 10.

Another implementation takes into account the recognition that H/S/NA-based resource configurations are not always necessary, and TDD scheduling may instead be sufficient in many applications to schedule communications with a DU and its child node. A CU typically is responsible for implementing resource scheduling and management of the entire network. In addition to providing H/S/NA and TDD DU-specific configurations to one or more connected DUs using the F1 interface, the CU can also provide directly to the child-node IAB-MTs a TDD configuration using a radio resource control (RRC) connection for scheduling communications between the DU at issue and one or more child nodes. In the conventional case where the TDD configuration provided by the CU to the IAB-MTs (e.g., a child node of the DU cell) ends up conflicting with the cell-specific resource configurations provided by the CU to the DUs over F1, a conflict is identified and the DU involved in the conflict backs off. The DUs conventionally back off despite the fact that not all conflicting configurations result in a data loss or other failure of communication, or that the DU could make a simple modification to fix it. Instead, in some configurations, the H/S/NA is not needed and communication scheduled using a TDD configuration is adequate to enable communications without a data loss.

Accordingly, in another aspect of the disclosure, a CU initially provides to a DU using an F1 interface, a designated resource configuration in an F1AP message as above, including a cell-specific TDD configuration. The CU also provides to the IAB-MTs including the DU's child node over an RRC connection, a TDD configuration governing a communication between the DU and at least one child node. In response to identifying a conflict between the configurations, the CU evaluating potential consequences of the conflict may determine that the RRC-based TDD configuration may be used (or temporarily adjusted) to change the overall configuration and thereby avoid data errors while also not backing off from the communication. The DU may sometimes recognize the conflict may be of such a nature that backing off from communication may simply introduce network lag. In some arrangements, the DU may send a request to the CU authorizing the DU to override the cell-specific configuration with a per-child configuration. Alternatively, the CU may make this decision.

The CU therefore sends an indication to the DU to override the TDD-based configuration provided over the F1 interface to enable an exchange of data between the DU and the at least one child node pursuant to the RRC-based per-child TDD configuration. Accordingly, the communication with the child node can proceed, maximizing efficiency.

After the communication or sequence of communications governed by the TDD configuration is complete, the cell specific configuration of the network cells may thereafter be put back into place to return to default conditions. Advantages of this approach include maximizing network throughput as well as removing network inefficiencies that the CU recognizes may result from potential conflicts in the configurations.

In some aspects of this technique, the CU may send a separate or accompanying indication to the DU that authorizes the DU (in lieu of the CU) to determine a new TDD RRC configuration for one or more child nodes. The CU may therefore revise the then-current RRC TDD configuration to provide a per-child configuration and proceed with communications to or from the child node(s) without backing off. This again results in maximized use of network resources for a given time, as well as maximum use of child node full-duplex capabilities (if present and if possible under the circumstances). In another implementation as noted above, the DU that is looking to make the RRC TDD configuration adjustment first sends a request to the DU, and the DU may grant the request.

As described above, the message sent from the CU to the DU to establish the respective resource configurations includes information from the GNB DU Resource Configuration IE. The below is a limited excerpt of certain example fields from this configuration that, in a current proposed framework, may be sent in a message to the DU to establish the per cell H/S/NA and TDD resource configurations. This message may be sent by the gNB-CU to provide the resource configuration for a gNB-DU. A gNB-DU corresponds to one or more cells, with each cell having the capability to serve at least one child node. Among other parameters, the message in the current framework includes the following IEs, and parameters to provide a copy of child-node IAB-DU's resource configuration.

configurations when serving this child node on the identified cell. In an optional implementation, an extra indication (e.g. 1 bit of information) may be included to clarify that the indicated NR CGI (and the accompanying information) is in fact deliberately associated with a cell at the IAB-DU. To

| | | | | |
|---|---|---|---|---|
| Child-Nodes List | 0 . . . 1 | | | List of child IAB-nodes served by the IAB-DU or IAB-donor-DU (difference?). |
| >Child-Nodes List Item | 1 . . . <maxnoofChildIABNodes> | | | |
| >>gNB-CU UE F1AP ID | M | | 9.3.1.4 | Identifier of a descendant node IAB-MT at the IAB-donor-CU. |
| >>gNB-DU UE F1AP ID | M | | 9.3.1.5 | Identifier of a child-node IAB-MT at an IAB-DU or IAB-donor-DU. |
| >>Child-Node Cells List | 0 . . . 1 | | | List of cells served by the child-node IAB-DU whose resource configuration is updated. |
| >>>Child-Node Cells List Item | 1 . . . <maxnoofServedCellsIAB> | | | |
| >>>>NR CGI [i.e., cell ID at child node] | M | | 9.3.1.12 | |
| >>>>CHOICE IAB-DU Cell Resource Configuration-Mode-Info | O | | | |
| >>>>>TDD | | | | |
| >>>>>>TDD Info | | 1 | | |
| >>>>>>>gNB-DU Cell Resource Configuration-TDD | M | | gNB-DU Cell Resource Configuration 9.3.1.107 | Contains TDD resource configuration of gNB-DU's cell. |
| >>>>>FDD | | | | |
| >>>>>>FDD Info | | 1 | | |
| >>>>>>>gNB-DU Cell Resource Configuration-FDD-UL | M | | gNB-DU Cell Resource Configuration 9.3.1.107 | Contains FDD UL resource configuration of gNB-DU's cell. |
| >>>>>>>gNB-DU Cell Resource Configration-FDD-DL | M | | gNB-DU Cell Resource Configuration 9.3.1.107 | Contains FDD DL resource configuration of gNB-DU's cell. |

In the abbreviated table identified above, the "child-node cells list" section may correspond to a list of cells served by the child-node IAB-DU whose resource configuration is updated. The term "NR CGI" refers to a cell identifier (ID) at the child-node IAB-DU.

In accordance with one aspect of the disclosure, to provide a per-child resource configuration, one or multiple cells in the child-node cells list as described above may be set by the CU to be identical to the serving cell(s) of the child-node IAB-MT. The parent-node IAB-DU receiving this message from the CU is configured to check the indicated "NR CGI". Upon checking the identifier (ID), the IAB-DU can determine that the NR CGI value is in fact referring to one of its own cells through which it serves one or more child nodes. In recognizing this misidentification (the misidentification being a result of the fact that the list is referring to child cells of the IAB-DU) the DU is further configured to use the accompanying indicated "gNB-DU Cell Resource Configuration" (as identified and described in part in the excerpt from the table above) to determine the H/S/NA and TDD avoid confusion, the description of the example table may be changed, for example, to the "List of cells served by the child-node IAB-DU and/or serving the child-node IAB-MT whose resource configuration is updated", with the underscored portion clarifying the added function of the message.

In the case of a multiple-parent (multi/dual-connected) child-node, one parent-node may be provided with the resource configuration of the other parent cell serving the child-node. Using the above method, this additional information can be provided to the parent-node to enable the parent node to coordinate scheduled communication with the child node.

In another implementation, the message can be configured to identify one or multiple cell in the "Child-Node Cells List" identified in the table above to be the serving cell(s) of the other IAB-DU. For example, the NR CGI identifier may identify the serving cell of the other IAB-DU serving the child node. The DU, upon determining that the identifier in the child node cells list is the same as the IAB-DU, may proceed to use the resource configuration information associated with the identifier in the table. In this event, the DU can modify its resource configuration to ensure that its communications do not conflict with that of the other IAB-DU. Thus a child-specific configuration can be achieved using the resource configuration that correlates to the identifier of the IAB-DU.

In some implementations, an extra indication (e.g. one bit of information) may be included to clarify that the indicated NR CGI (and the accompanying information) is for another parent-node IAB-DU.

Alternatively, as described above, instead of manipulating the current parameters and the IEs, the current message framework can remain, but with certain defined new parameters. One such implementation described above is to extend the GNB-DU Resource Configuration IE to further include a list of "Cells serving the child-node to be updated". Each identified cell may include a cell identifier (NR CGI) and resource configuration (e.g., IAB-DU Cell Resource Configuration-Mode-Info).

In another arrangement described above, the F1AP message of the CU (GNB-DU Resource Configuration) may be modified the to further include the following parameters to provide information including a "List of served cells served by another IAB-DU serving the child-node whose resource configuration is updated." These cells may also include an NR CGI identifier as well as an accompanying resource configuration.

In another arrangement described above, the per-cell configuration may be overridden by the TDD configuration of the child. Advantageously, the parent node is provided with the TDD information such that the parent node is aware of the child's TDD-based configuration. No communication conventionally can occur if the TDD pattern provided from an RRC connection conflicts with the cell-specific configuration.

As described above, in response to a conflict, the parent node in this example can use the per-child TDD configuration to override its understanding and communicate with the specific child (only) even in the case conflict.

Because the CU can orchestrate all these of these events, and has provided the gNB DU cell Resource configuration and the TDD configuration, the CU can knowledgably send an information indication (e.g., one bit) to the DU instructing the DU to use the RRC TDD configuration. To make this possible without causing a network error, the CU can send the DU the conflicting information along with the authorization to the DU to override its gNB DU cell-specific resource configuration in favor of the TDD configuration. The CU can also identify for which children the DU needs to do this exemption. The DU therefore can use the configuration provided over the RRC connection, e.g., TDD_UL_DL_Config_Dedic.

A multi-parent (multi/dual-connected) child-node may have limitations communicating with its parent nodes. This may especially be relevant to situations where the parent backhaul communications occur in the same frequency band and the child-node is not capable of simultaneous communication. In this event, the network (e.g., the CU) may have to orthogonalize (in the time-domain) the resources between the parents to serve the child-node.

In other examples, the child node may be capable of simultaneous communications with the parent-nodes (operating in the same or different bands) but still be subject to half-duplex constraints—i.e. it does not support simultaneous transmission and reception with the parents. For example, the child node may be capable of receiving from two nodes or of transmitting to two nodes, but not simultaneously transmitting and receiving. In this case, it may suffice for the network (CU) to just align the TDD configurations of the two (or multiple) communications, such that the child-node at any given time is either in the RX or in the TX mode over its multiple connections. This configuration obviates the problem of simultaneous TX/RX for that node, without the need to use TDM resources.

However, at the same time, another child of the first parent may not be subject to the same constraints (an inability to simultaneously receive and transmit, for example). In this event, it may be desirable to use a per child TDD configuration to maximize the network speed.

In addition, per-child H/S/NA may not be necessary in all cases. H/S/NA configurations can still be per-cell, but per-child TDD configuration can sometimes be used in lieu of per child H/S/NA.

As noted above, dedicated TDD configuration per child IAB-MT (TDD_UL_DL_ConfigDedicated) can be provided by the CU to the child-node IAB-MT (via RRC) and to the [parent-node] IAB-DU (via F1-AP), and different child-nodes can be configured with different TDD patterns. However, in IAB, "gNB-DU Cell Resource Configuration" includes a cell-specific TDD pattern provided by the CU to the DU. An IAB-DU may be expected to consider (comply with) this cell-specific TDD configuration when serving its children. So, for a given symbol n:

If n is indicated as D/U/F in the gNB-DU Cell Resource Configuration and D/U/F respectively in a TDDconfig-Common or TDDconfigDedicated for a child MT/UE→symbol n can be used for DL/UL/(DL or UL) respectively.

If n is indicated as D/U in the gNB-DU Cell Resource Configuration and F in a TDDconfigCommon or TDD-configDedicated for a child MT/UE→symbol n can be used for DL/UL respectively.

If n is indicated as F in the gNB-DU Cell Resource Configuration and D/U in a TDDconfigCommon or TDDconfigDedicated for a child MT/UE 4 symbol n can be used for DL/UL respectively.

If n is indicated as D/U in the gNB-DU Cell Resource Configuration and U/D respectively in a TDDconfig-Common or TDDconfigDedicated for a child MT/UE→symbol n cannot be used for any communication with the child MT/UE.

An implementation to provide a true per-child TDD configuration may include configuring different TDDconfigDedicated patterns for a given set of symbols (different patterns for different children), while labeling the same symbols in gNB-DU Cell Resource Configuration as Flexible. However, since the H/S/NA labeling is per D/U/F type, this implementation of forcing many resources to be F may reduce the flexibility of supporting a desired HSNA configuration.

Thus, as described in the above implementation, the CU can allow TDDconfigDedicated (which is RRC configured for a child-node) to override the cell-specific TDD configuration provided as part of IAB gNB-DU Cell Resource Configuration.

This procedure may be applicable only if the CU determines and provides the TDDconfigDedciated to IAB-DU (and the child-node), because the configuration in TDDconfigDedicated can be decided by either of CU or DU. It may be indicated to DU, for which child-node the above exemption rule can be applied. The indication can be via a new parameter in "Child-Nodes List Item" in "gNB-DU Cell Resource Configuration" message. This indication may only be applicable to child-node IAB-MTs, and not UEs, and only for child-nodes that are dual/multi-connected.

Alternatively, IAB-DU may request CU to allow overriding the cell-specific TDD configuration for a child-node using TDDconfigDedicated. In such a case, the DU itself may determine and indicates (to CU) the desired TDDconfigDedicated for the child-node.

Figure 11:
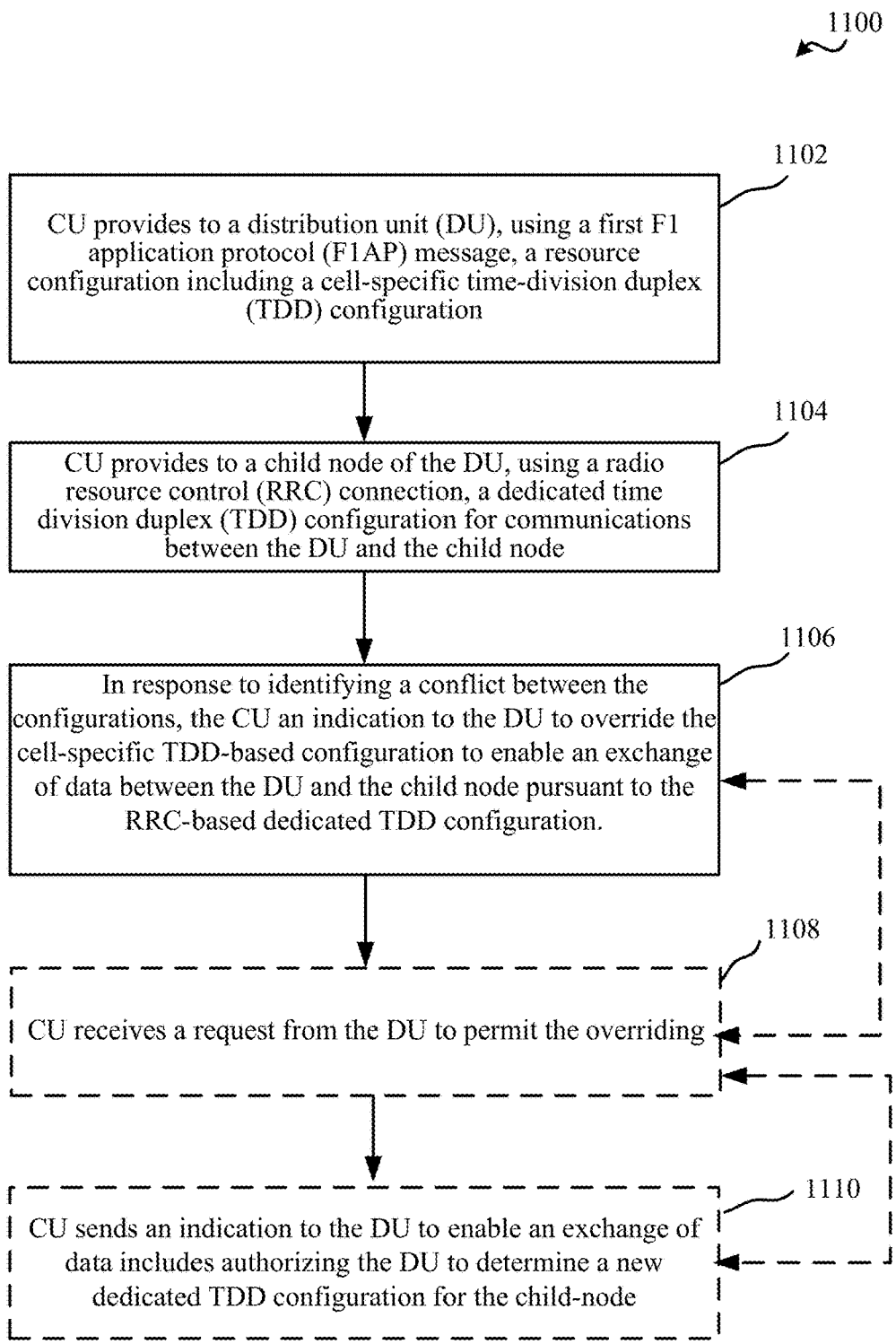
FIG. 11 is a flow chart illustrating an example of a method for wireless communications at a node such as an IAB node in accordance with various aspects of the present disclosure.

FIG. 11 is a flow diagram 1100 of a method at the CU for overriding a cell-specific configuration. At 1102, the CU provides to a distribution unit (DU), using a first F1 application protocol (F1AP) message, a resource configuration including a cell-specific time-division duplex (TDD) configuration. At 1104, CU provides to a child node of the DU, using a radio resource control (RRC) connection, a dedicated time division duplex (TDD) configuration for communications between the DU and the child node. Thereupon, at 1106, in response to identifying a conflict between the configurations, the CU an indication to the DU to override the cell-specific TDD-based configuration to enable an exchange of data between the DU and the child node pursuant to the RRC-based dedicated TDD configuration. In addition, optionally at 1108, the CU may receive a request from the DU to permit the overriding. Whether in response to the request at 1108 or at its own discretion the CU at 1110 the CU sends an indication to the DU to enable an exchange of data includes authorizing the DU to determine a new dedicated TDD configuration for the child-node.

FIGS. 7-11 may be performed by the CU or the DU in the figures identified above, as applicable. These identified structures may also be configured to perform the functions performed by the means limitations identified in the appended method claims and generally set forth in the means-plus-function claims.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The following examples are illustrative only and may be combined with aspects of other embodiments or teachings described herein, without limitation.

Example 1 is a method of wireless communications at a distributed unit (DU), comprising receiving, from a central unit (CU), a message comprising a resource configuration for a DU cell and a child cell corresponding to a child node served by the DU cell; determining, based on known configuration information at the DU, that the message misidentifies configuration information of the child cell; and communicating with the child node based on a modified configuration specific to the child node.

Example 2 is the method of Example 1, further comprising identifying a field in the message specifying one or more child cells, each child cell being associated with a cell ID including a misidentified child cell ID.

Example 3 is the method of any of Examples 1 and 2, wherein the modified configuration corresponds in the message to a configuration of a different cell.

Example 4 is the method of any of Examples 1 to 3, wherein communicating with the child node based on the modified configuration comprises modifying the DU cell configuration based on one or more capabilities or limitations of the child node.

Example 5 is the method of any of Examples 1 to 4, wherein the modified configuration comprises a per-link configuration.

Example 6 is the method of any of Examples 1 to 5, wherein communicating with the child node based on the modified configuration comprises sharing resources with the different cell to selectively communicate with the child node and with another node.

Example 7 is the method of any of Examples 1 to 6, wherein the DU comprises an integrated access backhaul DU (IAB-DU) node.

Example 8 is the method of any of Examples 1 to 7, wherein the child node comprises an integrated access backhaul mobile-termination (IAB-MT) node.

Example 9 is the method of any of Examples 1 to 8, wherein the modified configuration comprises at least one of hard (H), soft (S), or not available (NA).

Example 10 is the method of any of Examples 1 to 9, wherein the modified configuration comprises a time-division duplex (TDD) configuration.

Example 11 is the method of any of Examples 1 to 10, wherein the message further comprises an indication that an ID of the child cell is identical to an identifier of the DU cell.

Example 12 is an apparatus of wireless communications at a distributed unit (DU), comprising a memory, and at least one processor coupled to the memory, the at least one processor being configured to perform any of the functions described in any of Examples 1 to 11.

Example 13 is an apparatus of wireless communications at a distributed unit (DU), comprising means for performing any of the functions described in any of Examples 1 to 11.

Example 14 is a non-transitory computer-readable medium storing computer-executable code, the code when executed by a processor causes the processor to perform any of the functions described in any of Examples 1 to 11.

Example 15 is a method of wireless communications at a central unit (CU), comprising identifying a resource configuration for a child node served by a cell of a distributed unit (DU) to enable the child node to communicate with the DU and another node; generating a message misidentifying the child cell to be the another node; associating the resource configuration with the misidentified child cell in the message; and transmitting the message to the DU.

Example 16 is a method of Example 15, further comprising generating a field in the message specifying one or more child cells, each child cell being associated with a cell ID including the misidentified child cell ID.

Example 17 is a method of any of Examples 15 and 16, further comprising receiving a confirmation from the DU that the DU has modified a resource configuration of the DU cell based on the message.

Example 18 is a method of any of Examples 15 to 17, wherein the confirmation comprises an indication that the DU has successfully shared one or more resources with the another node to enable data exchanges between the child node and the DU as well as the child node and the another node.

Example 19 is a method of any of Examples 15 to 18, wherein the modified configuration comprise one of hard (H), soft (S), or not available, and a time domain configuration.

Example 20 is an apparatus of wireless communications at a central unit (CU), comprising a memory, and at least one processor coupled to the memory, the at least one processor being configured to perform any of the functions described in any of Examples 15 to 19.

Example 21 is an apparatus of wireless communications at a central unit (CU), comprising means for performing any of the functions described in any of Examples 15 to 19.

Example 22 is a non-transitory computer-readable medium storing computer-executable code, the code when executed by a processor causes the processor to perform any of the functions described in any of Examples 15 to 19.

Example 23 is a method of communication at a distributed unit (DU), comprising receiving, from a central unit (CU), a message comprising a first resource configuration for a cell associated with the DU and serving a child node; identifying in the message a second resource configuration for the DU cell; and modifying the first resource configuration based on the identified second configuration to enable the DU cell to communicate with the child node.

Example 24 is a method of Example 23, wherein modifying the first resource configuration based on the second identified configuration comprises substituting the identified configuration for the first DU cell configuration.

Example 25 is a method of any of Examples 23 and 24, wherein the message specifies a plurality of different cells serving the child node and configurations thereof.

Example 26 is a method of any of Examples 23 to 25, further comprising selectively using the first resource configuration and the modified configuration to enable the DU cell to communicate with the child node and at least one other child node.

Example 27 is a method of any of Examples 23 to 26, wherein selectively using the first resource configuration and the modified configuration further comprises using the first resource cell configuration in a first communication between the first DU cell and the at least one other child node; and using the modified configuration for use in a second communication between the DU cell and the child node.

Example 28 is a method of any of Examples 23 to 27, wherein the modified configuration comprises a child-node specific configuration.

Example 29 is a method of any of Examples 23 to 28, further comprising identifying, in the message, a second cell associated with a second DU and serving the child node and a configuration thereof.

Example 30 is a method of any of Examples 23 to 29, wherein the message specifies a plurality of different cells served by one or more DUs serving the child node, and respective configurations thereof.

Example 31 is a method of any of Examples 23 to 30, wherein modifying the first resource configuration based on the identified configuration to enable the DU cell to communicate with the child node further comprises modifying the first resource configuration based on the configuration of the second cell.

Example 32 is a method of any of Examples 23 to 31, wherein the first resource configuration comprises at least one of hard (H), soft (S) and not available (NA).

Example 33 is an apparatus of wireless communications at a distributed unit (DU), comprising a memory, and at least one processor coupled to the memory, the at least one processor being configured to perform any of the functions described in any of Examples 23 to 31.

Example 34 is an apparatus of wireless communications at a distributed unit (DU), comprising means for performing any of the functions described in any of Examples 23 to 31.

Example 35 is a non-transitory computer-readable medium storing computer-executable code, the code when executed by a processor causes the processor to perform any of the functions described in any of Examples 23 to 31.

Example 36 is a method of wireless communication of a central unit (CU), comprising providing to a distribution unit (DU), using a first F1 application protocol (F1AP) message, a resource configuration including a cell-specific time-division duplex (TDD) configuration; providing to a child node of the DU, using a radio resource control (RRC) message, a dedicated time division duplex (TDD) configuration for communications between the DU and the child node; providing to the DU, using a second F1AP message, the dedicated TDD configuration; and in response to identifying a conflict between the configurations, sending an indication to the DU to override the cell-specific TDD-based configuration to enable an exchange of data between the DU and the child node pursuant to the RRC-based dedicated TDD configuration.

Example 37 is a method of Example 36, further comprising providing the override as an element in a subsequent resource configuration message over the F1AP interface.

Example 38 is a method of any of Examples 36 and 37, wherein the child node comprises an integrated access backhaul—mobile termination (IAB-MT) node.

Example 39 is a method of any of Examples 36 to 38, wherein the child node is served by a plurality of parent cells.

Example 40 is a method of any of Examples 36 to 39, further comprising receiving a request from the DU to permit the overriding.

Example 41 is a method of any of Examples 36 to 40, wherein sending an indication to the DU to enable an exchange of data comprises authorizing the DU to determine a new dedicated TDD configuration for the child-node.

Example 42 is an apparatus of wireless communications at a central unit (CU), comprising a memory, and at least one processor coupled to the memory, the at least one processor being configured to perform any of the functions described in any of Examples 36 to 40.

Example 43 is an apparatus of wireless communications at a central unit (CU), comprising means for performing any of the functions described in any of Examples 36 to 40.

Example 44 is a non-transitory computer-readable medium storing computer-executable code, the code when executed by a processor causes the processor to perform any of the functions described in any of Examples 36 to 40.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a distributed unit (DU), comprising:
   receiving, from a central unit (CU), a message comprising a resource configuration for a DU cell and a child cell corresponding to a child node served by the DU cell;
   determining, based on known configuration information at the DU, that the message misidentifies configuration information of the child cell; and
   communicating with the child node based on a modified configuration specific to the child node.

2. The method of claim 1, further comprising identifying a field in the message specifying one or more child cells, each child cell being associated with a cell ID including a misidentified child cell ID.

3. The method of claim 1, wherein the modified configuration corresponds in the message to a configuration of a different cell.

4. The method of claim 3, wherein communicating with the child node based on the modified configuration comprises sharing resources with the different cell to selectively communicate with the child node and with another node.

5. The method of claim 1, wherein communicating with the child node based on the modified configuration comprises modifying the DU cell configuration based on one or more capabilities or limitations of the child node.

6. The method of claim 5, wherein the modified configuration comprises a per-link configuration.

7. The method of claim 1, wherein the DU comprises an integrated access backhaul DU (IAB-DU) node.

8. The method of claim 1, wherein the child node comprises an integrated access backhaul mobile-termination (IAB-MT) node.

9. The method of claim 1, wherein the modified configuration comprises at least one of hard (H), soft (S), or not available (NA).

10. The method of claim 1, wherein the modified configuration comprises a time-division duplex (TDD) configuration.

11. The method of claim 1, wherein the message further comprises an indication that an ID of the child cell is identical to an identifier of the DU cell.

12. An apparatus of wireless communications at a distributed unit (DU), comprising:
    a memory;
    at least one processor coupled to the memory and configured to:
      receive, from a central unit (CU), a message comprising a resource configuration for a DU cell and a child cell corresponding to a child node served by the DU cell;
      determine, based on known configuration information at the DU, that the message misidentifies configuration information of the child cell; and
      communicate with the child node based on a modified configuration specific to the child node.

13. The apparatus of claim 12, wherein the at least one processor is further configured to identify a field in the message specifying one or more child cells, each child cell being associated with a cell ID including a misidentified child cell ID.

14. The apparatus of claim 12, wherein the modified configuration corresponds in the message to a configuration of a different cell.

15. The apparatus of claim 12, wherein the at least one processor is further configured to communicate with the child node based on the modified configuration by modifying the DU cell configuration based on one or more capabilities or limitations of the child node.

16. The apparatus of claim 15, wherein the modified configuration comprises a per-link configuration.

17. The apparatus of claim 12, wherein the at least one processor is further configured to communicate with the child node based on the modified configuration of the child cell by sharing resources with a different cell to selectively communicate with the child node and with another node.

18. The apparatus of claim 12, wherein the DU comprises an integrated access backhaul DU (IAB-DU) node.

19. The apparatus of claim 12, wherein the child node comprises an integrated access backhaul mobile-termination (IAB-MT) node.

20. The apparatus of claim 12, wherein the modified configuration comprises at least one of hard (H), soft (S), or not available (NA).

21. An apparatus of wireless communications at a distributed unit (DU), comprising:
  means for receiving, from a central unit (CU), a message comprising a resource configuration for a DU cell and a child cell corresponding to a child node served by the DU cell;
  means for determining, based on known configuration information at the DU, that the message misidentifies configuration information of the child cell; and
  means for communicating with the child node based on a modified configuration specific to the child node.

22. The apparatus of claim 21, wherein the means for determining is further configured to identify a field in the message specifying one or more child cells, each child cell being associated with a cell ID including a misidentified child cell ID.

23. The apparatus of claim 21, wherein the modified configuration corresponds in the message to a configuration of a different cell.

24. The apparatus of claim 21, wherein the means for communicating with the child node based on the modified configuration is further configured to modify the DU cell configuration based on one or more capabilities or limitations of the child node.

25. The apparatus of claim 24, wherein the modified configuration comprises a per-link configuration.

26. A non-transitory computer-readable medium storing computer-executable code, the code when executed by a processor causes the processor to:
  receive, from a central unit (CU), a message comprising a resource configuration for a distributed unit (DU) cell and a child cell corresponding to a child node served by the DU cell;
  determine, based on known configuration information at the DU, that the message misidentifies configuration information of the child cell; and
  communicate with the child node based on a modified configuration specific to the child node.

27. The computer-readable medium of claim 26, wherein the code further causes the processor to identify a field in the message specifying one or more child cells, each child cell being associated with a cell ID including a misidentified child cell ID.

28. The computer-readable medium of claim 26, wherein the modified configuration corresponds in the message to a configuration of a different cell.

29. The computer-readable medium of claim 26, wherein the code further causes the processor to communicate with the child node based on the modified configuration by modifying the DU cell configuration based on one or more capabilities or limitations of the child node.

30. The computer-readable medium of claim 29, wherein the modified configuration comprises a per-link configuration.

* * * * *